US011366866B2

(12) United States Patent
Agrawal et al.

(10) Patent No.: US 11,366,866 B2
(45) Date of Patent: Jun. 21, 2022

(54) GEOGRAPHICAL KNOWLEDGE GRAPH

(71) Applicant: Apple Inc., Cupertino, CA (US)

(72) Inventors: Ashish Kumar Agrawal, Sunnyvale, CA (US); Saurabh V. Pendse, San Jose, CA (US); Archana Bhattarai, Sunnyvale, CA (US); Tejaswi Tenneti, San Jose, CA (US)

(73) Assignee: Apple Inc., Cupertino, CA (US)

( * ) Notice: Subject to any disclaimer, the term of this patent is extended or adjusted under 35 U.S.C. 154(b) by 727 days.

(21) Appl. No.: 15/994,889

(22) Filed: May 31, 2018

(65) Prior Publication Data

US 2019/0179917 A1 Jun. 13, 2019

Related U.S. Application Data

(60) Provisional application No. 62/596,286, filed on Dec. 8, 2017.

(51) Int. Cl.
| | |
|---|---|
| *G06F 17/30* | (2006.01) |
| *G06F 16/9537* | (2019.01) |
| *G01C 21/34* | (2006.01) |
| *G06F 16/29* | (2019.01) |
| *G06F 16/901* | (2019.01) |
| *G01C 21/36* | (2006.01) |

(52) U.S. Cl.
CPC ..... *G06F 16/9537* (2019.01); *G01C 21/3476* (2013.01); *G01C 21/3605* (2013.01); *G06F 16/29* (2019.01); *G06F 16/9024* (2019.01)

(58) Field of Classification Search
CPC ........ G06F 16/953; G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 7,437,295 | B2 | 10/2008 | Pitts, III et al. |
| 7,523,108 | B2 | 4/2009 | Cao |
| 8,015,196 | B2 | 9/2011 | Taranenko et al. |
| 8,200,676 | B2 | 6/2012 | Frank |

(Continued)

OTHER PUBLICATIONS

Song et al. "Query Suggestion by Constructing Term-Transition Graphs", 2012, ACM. (Year: 2012).*

(Continued)

*Primary Examiner* — Hung D Le
(74) *Attorney, Agent, or Firm* — BakerHostetler

(57) ABSTRACT

A device implementing a system for providing search results includes at least one processor configured to receive plural terms corresponding to a map-based search query, determine plural interpretations of the map-based search query, each interpretation based on a respective combination of tagging one or more of the plural terms as at least one of a first type, a second type or a third type. The at least one processor is configured to, for each interpretation, determine a set of weight values for the interpretation, based on at least one of context data of the device or a feature of the respective combination, and to assign a score for the interpretation based on the set of weight values for the interpretation. The at least one processor is configured to provide at least one completion suggestion or search result based on the plural interpretations and on the assigned scores.

20 Claims, 14 Drawing Sheets

(56) References Cited

U.S. PATENT DOCUMENTS

| | | |
|---|---|---|
| 9,064,006 B2 | 6/2015 | Hakkani-Tur et al. |
| 9,721,157 B2 | 8/2017 | Frank et al. |
| 2008/0065685 A1 | 3/2008 | Frank |
| 2008/0243783 A1* | 10/2008 | Santi .................. G06F 16/9535 |
| 2009/0119255 A1 | 5/2009 | Frank et al. |
| 2011/0252064 A1* | 10/2011 | Murugappan ......... G06F 16/487 |
| | | 707/E17.014 |
| 2013/0204895 A1* | 8/2013 | Liao ..................... G06F 16/951 |
| | | 707/E17.039 |
| 2014/0207748 A1* | 7/2014 | Sood .................. G06F 16/9537 |
| | | 707/706 |
| 2016/0084667 A1* | 3/2016 | Ziezold ..................... G06T 3/40 |
| | | 345/428 |

OTHER PUBLICATIONS

Feng et al., "POI2Vec: Geographical Latent Representation for Predicting Future Visitors", Feb. 9, 2017, 31st AAAI Conference on Artificial Intelligence. (Year: 2017).*

Liu et al., "Exploring the Context of Locations for Personalized Location Recommendations", 2016, Proceedings of the Twenty-fifth International Joint Conference on Artificial Intelligence. (Year: 2016).*

Cao et al., "Context-Aware Query Classification", 2009, ACM. (Year: 2009).*

* cited by examiner

GEOGRAPHICAL KNOWLEDGE GRAPH

CROSS-REFERENCE TO RELATED APPLICATIONS

The present application claims the benefit of U.S. Provisional Patent Application Ser. No. 62/596,286, entitled "GEOGRAPHICAL KNOWLEDGE GRAPH," filed Dec. 8, 2017, which is hereby incorporated herein by reference in its entirety and made part of the present U.S. Utility Patent Application for all purposes.

TECHNICAL FIELD

The present description generally relates to providing query completion suggestions and/or search results, including providing query completion suggestions in response to a map-based search query.

BACKGROUND

Electronic devices such as laptops, mobile phones, computers and mobile media devices can run applications for performing map-based searches. A user can input a map-based search query within such an application on the electronic device, and the application on the electronic device can send the query to a server, in order to obtain one or more completion suggestion(s) and/or search result(s) based on the map-based search query.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject system utilizes a geographical knowledge graph to provide query completion suggestions and/or search results to a device in response to a map-based search query entered by a user of the device. For example, when a user enters a map-based search query, completion suggestions and/or search results for locations that correspond to the intent of the search query may be of particular interest to the user. The completion suggestion(s) and/or search result(s) may be one or more of points of interest, addresses, or suggested queries that may be provided for selection by the user.

In the subject system, a server may receive a map-based search query from a device, where the map-based search query includes plural terms. The server may determine, using a geographical knowledge graph, plural interpretations of the map-based search query, where each interpretation is based on different combinations of tagging one or more of the plural terms as a first type (e.g., a concept corresponding to brand name, a category, an attribute and/or a proximity), a second type (e.g., a point of interest) and/or a third type (e.g., a geographical entity). For each interpretation of the plural interpretations, the server determines a set of weight values for the interpretation, based on context data of the device and/or on a feature of the respective combination of tagging the plural terms. The server may assign a score for the interpretation based on the set of weight values for the interpretation. In addition, the server may utilize the plural interpretations of the map-based search query, and/or the scores assigned thereto, to provide at least one completion suggestion or search result for the map-based search query to the device.

Thus, the subject system utilizes the geographical knowledge graph to provide completion suggestions and/or search results that are aligned with the intent of the user for a given map-based search query, thereby allowing the user to quickly and efficiently find and access relevant geographical information.

Figure 1:
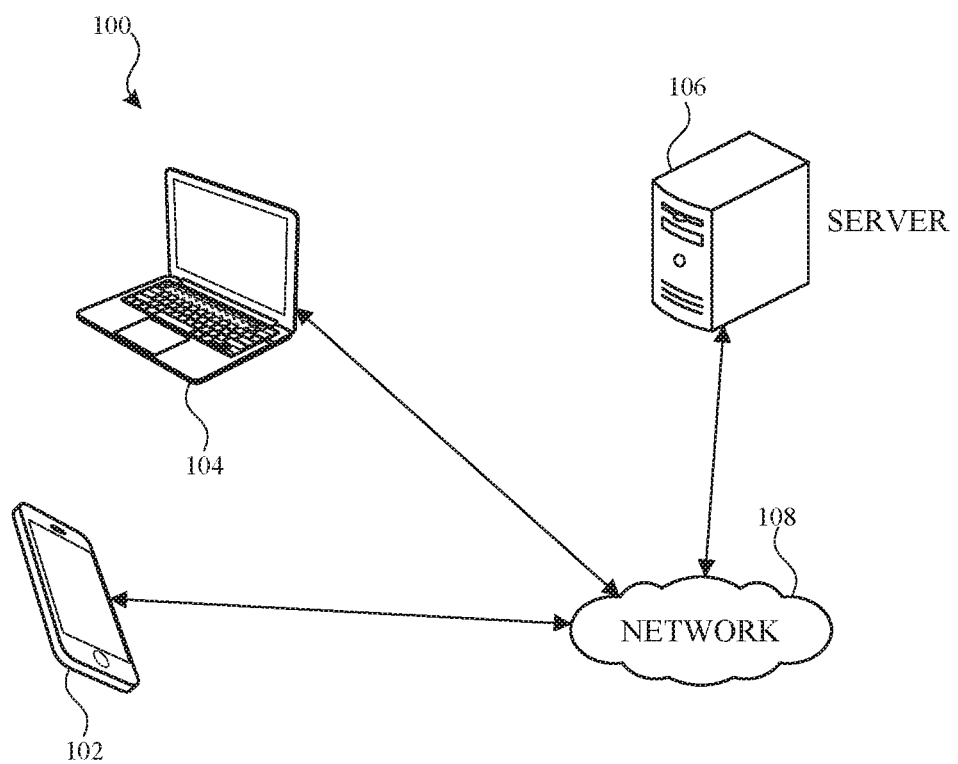
FIG. 1 illustrates an example network environment for performing a map-based search using a geographical knowledge graph in accordance with one or more implementations.

FIG. 1 illustrates an example network environment 100 for performing a map-based search using a geographical knowledge graph in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102 and 104 (hereinafter 102-104), a server 106, and a network 108. The network 108 may communicatively (directly or indirectly) couple, for example, any two or more of the electronic devices 102-104 and/or the server 106. In one or more implementations, the network 108 may be an interconnected network of devices that may include, or may be communicatively coupled to, the Internet. For explanatory purposes, the network environment 100 is illustrated in FIG. 1 as including electronic devices 102-104 and a single server 106; however, the network environment 100 may include any number of electronic devices and any number of servers.

One or more of the electronic devices 102-104 may be, for example, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, and the electronic device 104 is depicted as a laptop computer. Each of electronic devices 102-104 may be, and/or may include all or part of the electronic system discussed below with respect to FIG. 14. In one or more implementations, the electronic devices 102-104 may be associated with the same user (e.g., by way of a shared user account). Alternatively, the electronic devices 102-104 may be associated with different users.

One or more of the electronic devices 102-104 may include positioning circuitry for determining device location. Examples of such positioning technologies include, but are not limited to, Global Navigation Satellite System (GNSS), wireless access point technology (e.g., based on time of arrival, angle of arrival, and/or signal strength of signals received from wireless access points at known locations), cellular phone signal positioning, Bluetooth signal positioning, image recognition positioning. In addition, one or more of the electronic devices 102-104 may implement an inertial navigation system (INS) which uses device sensor(s) (e.g., motion sensors such as accelerometers, gyroscope) to calculate device state (e.g., position, orientation and velocity) for supplementing location data provided by the above-mentioned positioning technologies.

The server 106 may be, and/or may include all or part of, the server discussed below with respect to FIG. 2, and/or the electronic system discussed below with respect to FIG. 14. The server 106 may include one or more servers, such as a cloud of servers, that may be used in a system for using a geographical knowledge graph to provide completion suggestions and/or search results in response to a map-based search query.

For example, a user may input a map-based search query, which includes one or more terms, within an application running on either of the electronic devices 102-104 (hereinafter the electronic device 102, for purposes of this example). The electronic device 102 may send the search query (either a partial query or a full query) to the server 106. The server 106 may determine, using a geographical knowledge graph, plural interpretations of the map-based search query, rank and/or prune the plural interpretations, and provide at least one completion suggestion or search result to the electronic device 102, based on the ranked and/or pruned plural interpretations of the map-based search query.

The completion suggestions and/or search results provided by the server 106 may correspond, for example, to points of interest. Examples of points of interest include, but are not limited to, stores, restaurants, kiosks, gas stations, service stations, government properties, office buildings, hotels, residential properties, museums, amusement parks, airports, stations, public transport system stations, public parks, landmarks, shopping malls, sports venues, music venues, or any identifiable location. Alternatively, or in addition, the completion suggestions and/or search results may correspond to geographical entities (e.g., street address, city name, street intersection).

Figure 2:
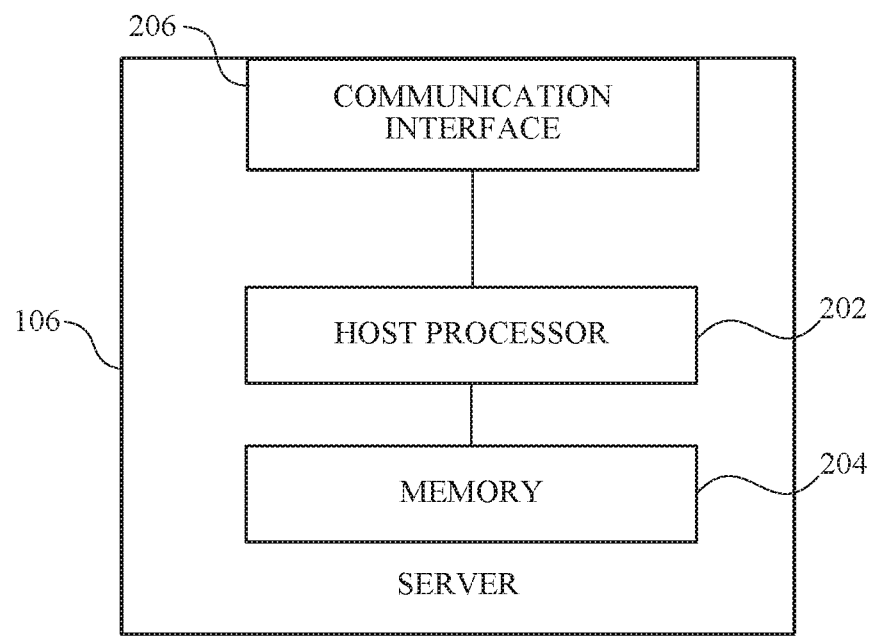
FIG. 2 illustrates an example server that may implement at least part of the subject system in accordance with one or more implementations.

FIG. 2 illustrates an example server 106 that may implement at least part of the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The server 106 may include a host processor 202, a memory 204, and a communication interface 206. The host processor 202 may include suitable logic, circuitry, and/or code that enable processing data and/or controlling operations of the server 106. In this regard, the host processor 202 may be enabled to provide control signals to various other components of the server 106. The host processor 202 may also control transfers of data between various portions of the server 106. Additionally, the host processor 202 may implement an operating system or may otherwise execute code to manage operations of the server 106.

The memory 204 may include suitable logic, circuitry, and/or code that enable storage of various types of information such as received data, generated data, code, and/or configuration information. The memory 204 may include, for example, random access memory (RAM), read-only memory (RUM), flash, and/or magnetic storage.

In one or more implementations, the memory 204 may store a geographical knowledge graph (or generally any data structure) which facilitates in determining completion suggestions and/or search results for a map-based search query (e.g., received from one of the electronic devices 102-104). The geographical knowledge graph may be used to determine plural interpretations of the map-based search query, each interpretation based on a respective combination of tagging one or more terms of the query as at least one of, for example, a brand name, a category, an attribute, a proximity, a point of interest, or a geographical entity. The geographical knowledge graph may provide output to a machine learning model, which determines, for each interpretation of the plural interpretations, a set of weight values for the interpretation, based on at least one of context data of the device or on a feature of the respective combination of tagging one of more of the plural terms. A score may be assigned for each interpretation based on the set of weight values for the interpretation. The interpretations may be ranked/pruned based on the assigned scores, for downstream processing by the server 106, so that the server can provide completion suggestion(s) and/or search result(s). The geographical knowledge graph is discussed further below with respect to FIG. 10.

The communication interface 206 may include suitable logic, circuitry, and/or code that enables wired or wireless communication, such as between the server 106 and the electronic devices 102-104 over the network 108. The communication interface 206 may include, for example, one or more of a Bluetooth communication interface, an NFC interface, a Zigbee communication interface, a WLAN communication interface, a USB communication interface, or generally any communication interface. The communication interface 206 may be used to receive search terms and/or partial search terms from the electronic devices 102-104, and to transmit completion suggestions and/or search results to the electronic devices 102-104.

In one or more implementations, one or more of the host processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
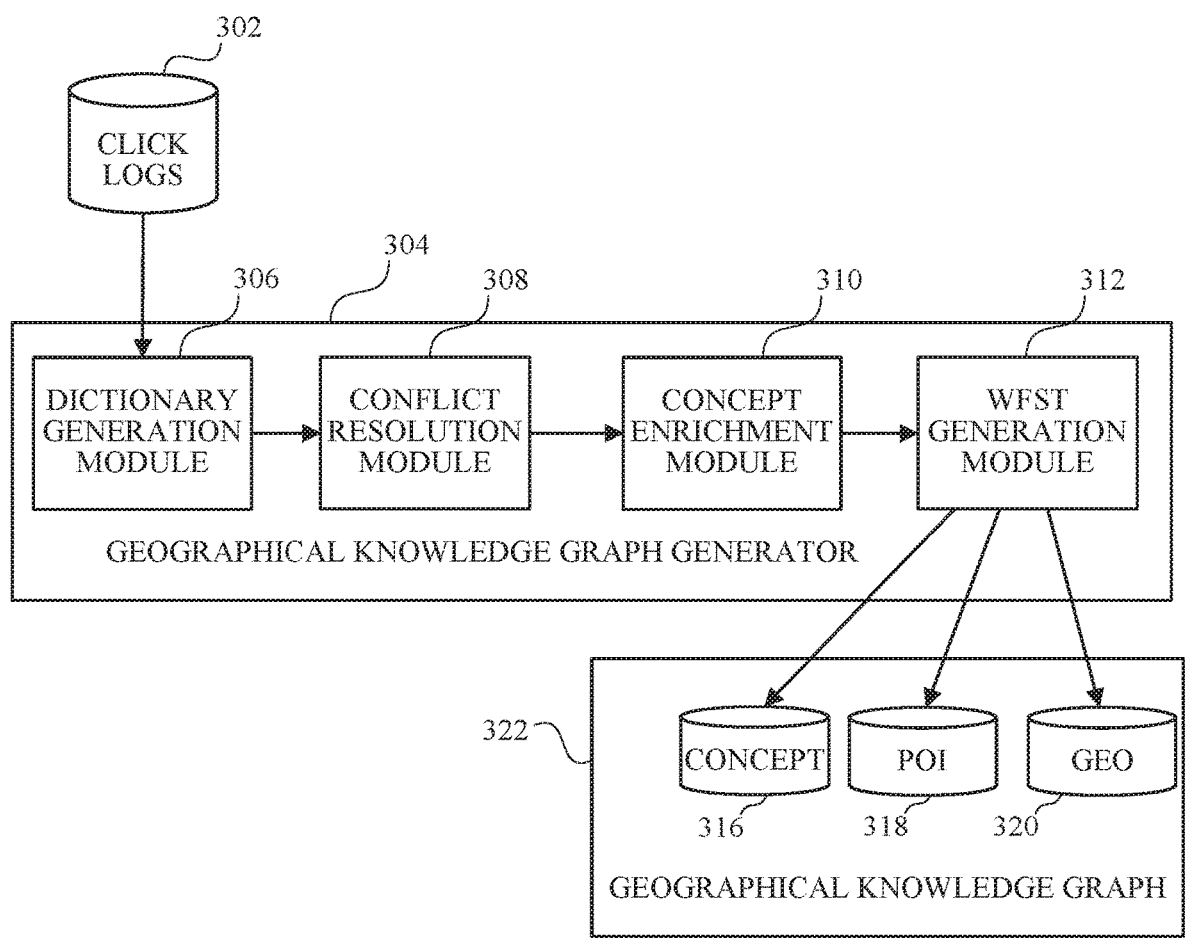
FIG. 3 illustrates a block diagram of an example of generating a geographical knowledge graph in accordance with one or more implementations.

FIG. 3 illustrates a block diagram of an example of generating a geographical knowledge graph in accordance with one or more implementations. For example, the generation of a geographical knowledge graph can be implemented by one or more software modules running on the host processor 202 of the server 106 and/or any other device. In another example, the generation of a geographical knowledge graph can be implemented by one or more software modules implemented by custom hardware (e.g., one or more coprocessors) configured to execute the click log analysis functionality. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 3, the geographical knowledge graph generator 304 includes a dictionary generation module 306, a conflict resolution module 308, a concept enrichment module 310 and a weighted finite state transducer (WFST) generation module 312. In one or more implementations, the dictionary generation module 306 defines different types of tags for tagging the terms (or "tokens") of the map-based search query (e.g., based on the click logs 302). The conflict resolution module 308 resolves conflicts associated with the different tag types, and the concept enrichment module 310 accounts for nuances and/or exceptions geographic nuances) associated with particular triggers.

With respect to the dictionary generation module 306, one component of a query intent determination system is a dictionary of terms that relate to one of the concepts in the domain. As an example, the "coffee" category may have multiple related terms such as "coffee," "cafe," "cofee" (misspelled), and "mocha." All of these terms inherently mean a canonical form "coffee." In one or more implementations, the dictionary generation module 306 may implement a clustering algorithm that learns to group all related terms to their canonical form with a certain confidence. In doing so, the dictionary generation module 306 retrieves log data pertaining to user click behavior (e.g., the click logs 302), and analyzes the log data to determine a relevance of each historical query to a business/address. For example, this may be done by clustering semantically similar queries based on user feedback in the form of the click logs 302.

In this regard, the click logs 302 represent a history of user interaction for all users of a particular system) with respect to map-based search queries. The click logs 302 may include the prior search queries, completion suggestions and/or search results which were presented to users, and the frequency with which those completion suggestions and/or search results were selected by the users. The click logs 302 may also store context data associated with the queries, including but not limited to geohashes (e.g., alphanumeric strings expressing location and varying in length, with greater precision for longer strings), and the device language. In one or more implementations, a geohash may be indicative of a location, a region, or any geographical area.

The dictionary generation module 306 defines different types of tags for tagging the terms (or "tokens") of the map-based search query. Table 1 illustrates an example of different tag types for tagging tokens of a search query:

TABLE 1

| Tag Type | Example |
| --- | --- |
| Chain/Brand (B) | {XYZ coffee} |
| Category (C) | {coffee shops} |
| Attribute (A) | {24 hour} |
| Proximity (P) | {near me} |
| POI | {Golden Gate Bridge} |
| Geo | {123 main street, redmond} |

A first tag type of tag is a "concept," which represents any of: a chain/brand tag, a category tag, an attribute tag, or a proximity tag, as shown in the above example of Table 1. As also shown in Table 1, a second tag type is a POI (e.g., an entity such as a specific location of a retail chain store, a business, or a landmark), and a third tag type "geo" is a geographical entity (e.g., an address or a city name).

Figure 4:
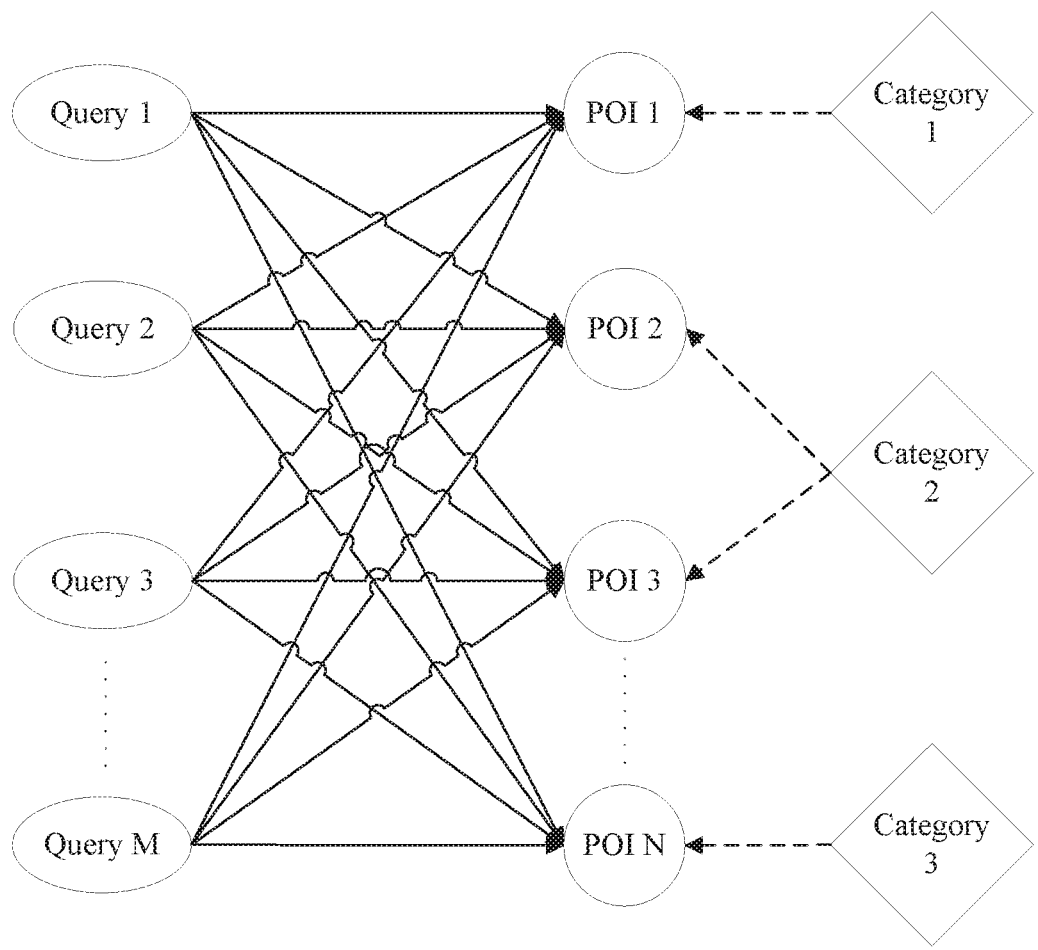
FIG. 4 illustrates a click-through graph of example relationships between search queries, points of interest and categories in accordance with one or more implementations.

In this regard, FIG. 4 illustrates a click-through graph of example relationships between search queries, points of interest and categories in accordance with one or more implementations. The dictionary generation module 306 defines "triggers" for the different tag types by clustering queries based on the click logs 302. For example, it may be determined from the click logs 302 that a POI was liked by user(s) based on some criteria and the POI belonging to a category. In the example of FIG. 4, the click logs 302 store data for queries 1-M, and POIs 1-N. Categories 1-3 may be associated with respective ones of the POIs 1-N based on the click logs 302. In other words, if a query shows a high affinity to a range of POIs that all belong to a certain category/chain, then the dictionary generation module 306 may determine that the query is semantically related to the category/chain of the POI.

Figure 5:
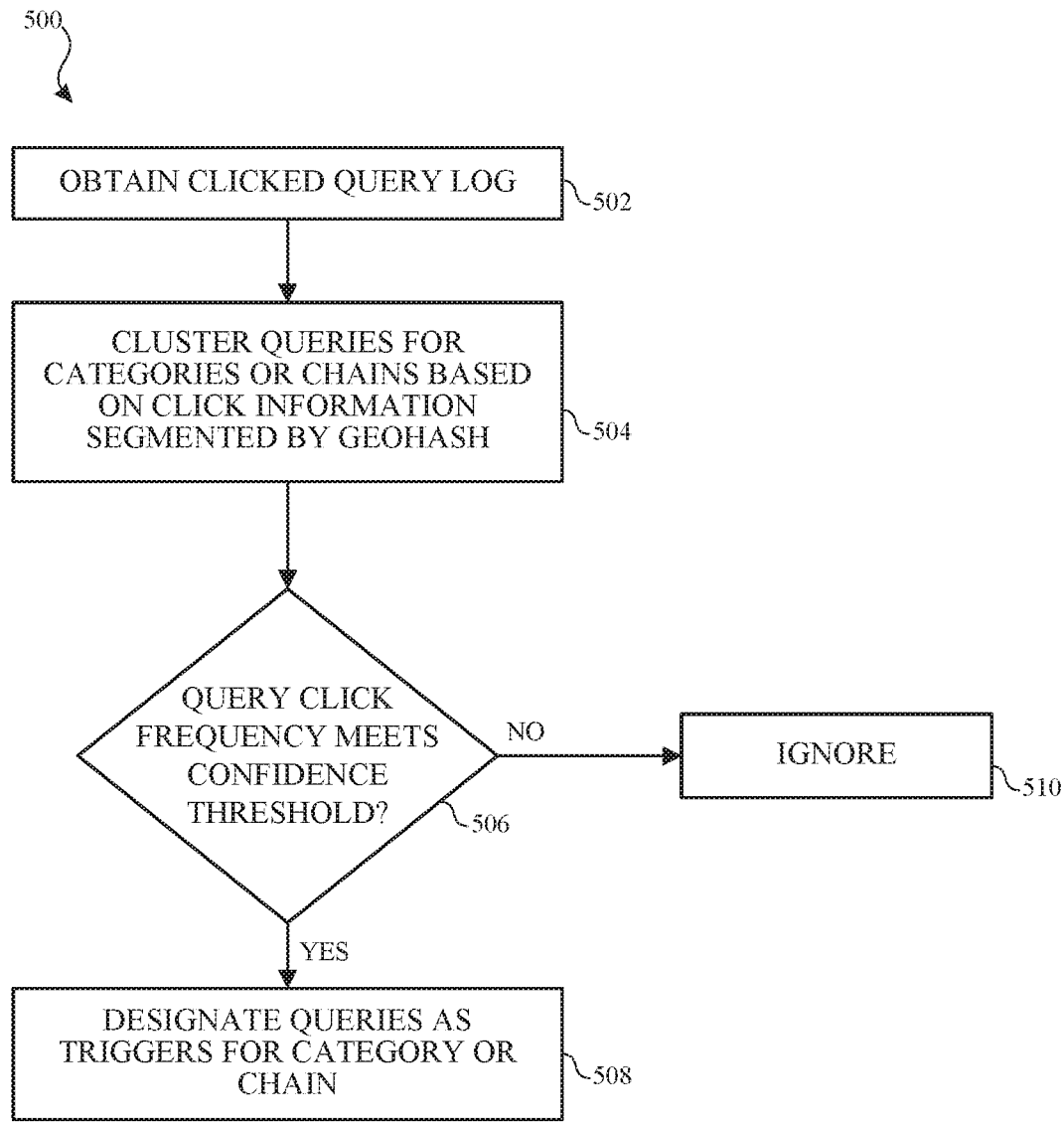
FIG. 5 illustrates a flow diagram of an example process for clustering search queries that are triggers for tag types in accordance with one or more implementations.

FIG. 5 illustrates a flow diagram of an example process for clustering search queries that are triggers for tag types in accordance with one or more implementations. For explanatory purposes, the process 500 is primarily described herein with reference to the dictionary generation module 306, which may be implemented by the server 106 of FIG. 1. However, the process 500 is not limited to the server 106 of FIG. 1, and one or more blocks (or operations) of the process 500 may be performed by one or more other components of the server 106 and/or by other suitable devices. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The dictionary generation module 306 obtains the click logs 302 (502), and clusters queries for tagging terms as categories or chains/brands based on click information segmented by geohash (504). The dictionary generation module 306 determines if a query click frequency (e.g., a frequency at which a completion suggestion and/or search result was selected after searching for the query) meets a predefined confidence threshold (506). If the frequency meets the confidence threshold, the dictionary generation module 306 designates the query as a trigger for the respective category or chain (508). Otherwise, the dictionary generation module 306 does not make such a designation (510).

In one or more implementations, if a query is typically associated with a particular POI in a given context of geohash and language, then the dictionary generation module 306 may determine that such queries are local navigational queries to that given POI (e.g., a local business). On the other hand, if a query is typically associated with a particular POI irrespective of the geohash context, then the dictionary generation module may determine that such queries are global navigational queries to that given POI (e.g., the Eiffel tower). In other words, if the click logs 302 indicate that users, irrespective of location, pick a particular location, then the corresponding query may be identified as a global navigation query.

Thus, the dictionary generation module 306 defines triggers for associating tag types (e.g., concept, POI, geo) with terms/tokens of a search query. As illustrated in FIG. 3, the geographical knowledge graph generator 304 also includes a conflict resolution module 308. Apart from learning the triggers from user queries (e.g., from click logs 302), the triggers may be populated from several sources such as editorial inputs, names of businesses provided by a data vendor, and the like. Because the triggers are harvested from several sources, it is possible for there to be conflicts and erroneous terms. Such conflicts and erroneous terms may adversely affect the accuracy of query interpretation.

An example of a conflict is a brand with the name "@Burger" and an entry in the dictionary with the term "burger" associated with this brand type for tagging. The dictionary may also contain the term "burger" in association with the category type for tagging. The dictionary may thus return both of these concepts (namely the brand type and the category type), which creates a conflict for understanding the intent of the query.

The conflict resolution module 308 enumerates the possible concepts associated with each unique trigger that is a possible entry candidate in the dictionary. For each tag type (e.g., concept, POI, geo), the conflict resolution module 308 trains and uses a corresponding machine learning classifier that outputs a confidence score indicating how strongly a trigger is associated with the tag type.

In one or more implementations, the conflict resolution module 308 uses gradient boosted regression trees to train three binary classifiers for each of the following tag types: (1) category classifier, (2) brand/chain classifier, and (3) geographical entity classifier.

Example features for each classifier are discussed below. In describing these example features, a "win" may be defined as a condition in which the conflict resolution module 308 deterministically observes a signal that the user is satisfied with the completion suggestion(s) and/or search results. A dominant feature in the classifiers is a "win rate," which is computed as a function of the frequency at which the users (e.g., based on the click logs 302) were satisfied with the results shown among all the searches done in a given period of time (e.g., clicked/navigated to, looked for the information regarding, or called the business). In this regard, win rate may be calculated as:

win rate=(total searches with positive user interactions/total searches performed)

The category classifier may implement one or more of the following features: a category intent win rate, an intended category win rate, a lexical match to canonical name value, a misspelling value, a category query popularity score, a category business popularity score, a trigger popularity score, a conflicts with another category value, a conflicting category win rate, a conflicts with chain/brand value, and a conflicting chain/brand win rate.

The category intent win rate may be determined from past search sessions, and may correspond to the fraction of times a given trigger was classified as the intent category type. For example, for the trigger "a" this is the fraction of times a win was observed when the trigger was classified as the category type. This may be calculated as follows:

win rate=(number of times win occurs when the trigger was classified as a category)/(number of times this trigger was present as a part of a user query).

The intended category win rate may be determined from past search sessions, and may correspond to the fraction of times a given trigger was classified to be same as the given category. For the trigger "atm" and a category "banks.atms" that it is associated with, this is the fraction of times it was classified for a query intended to find businesses with that category.

The lexical match to canonical name value may correspond to a similarity value computed (e.g., the Jaccard similarity measure) between the trigger and its canonical name in the corresponding language. For example, each category may have a unique name associated with it, for each language supported. The unique name may be a name that uniquely identifies the concept independent of the language and trigger, and may be referred to as the canonical name. The canonical name and language may then be used to select an appropriate name for display purposes. Names that are displayed may be formatted, spell corrected, and/or associated with appropriate visual icons.

The misspelling value may be a boolean feature to check if the trigger is a commonly misspelled form of the given category. For example, the misspelling value may be set to true for the trigger "cofee" when associated with the category "cafes.coffee."

The category query popularity score may signify how popular a given category is among all categories that users search for in a fixed time period, such as 3 months. The category query popularity score can be calculated as follows:

score=(number of times win occurs when trigger was classified as the given category)/(total number of wins for a query of any category).

The category business popularity score may signify the fraction of total businesses that belong to this category The trigger popularity score may signify how frequently users search for the given trigger in a fixed time period, such as 3 months. This score can be calculated as follows:

score=(number of times when a user query exactly matches the trigger)/(total number of user queries).

The conflicts with another category value may be a boolean feature to check if the given trigger is also associated with another category. The conflicting category win rate may be similar to the category intent win rate applied to the conflicting category.

The conflicts with chain/brand value may be a boolean feature to check if the given trigger is associated with another chain/brand. The conflicting chain/brand win rate may be similar to the category intent win rate applied to the conflicting chain/brand.

The brand/chain classifier may implement one or more of the following features: a brand intent win rate, an intended brand win rate, a lexical match to canonical name value, a misspelling value, a brand query popularity score, a brand business popularity score, a trigger popularity score, a conflicts with another category value, a conflicting category win rate, and conflicts with chain/brand value, a conflicting chain/brand win rate.

The brand intent win rate may be determined from past search sessions, and may correspond to the fraction of times a win occurs when the trigger was classified as the brand type. For example, with the trigger "atm," this is the fraction of times "atm" was classified as a trigger of the brand type. This may be computed as:

win rate=(number of times see win is observed when the trigger was classified as a brand)/(number of times this trigger was present as a part of a user query).

The intended brand win rate may be determined from past search sessions, and may correspond to the fraction of times the trigger was classified to be same as the given category. For the trigger "atm" and a brand "GHI Bank" that it is associated with, this is the fraction of times the trigger was classified as a query intended to find businesses that match the brand.

The lexical match to canonical name value may correspond to a similarity value computed (e.g., the Jaccard similarity measure) between the trigger and its canonical name in the corresponding language. For example, each brand may have a unique name associated with it, for each language supported. The unique name may be a name that uniquely identifies the concept independent of the language and trigger, and may be referred to as the canonical name. The canonical name and language may then be used to select an appropriate name for display purposes. Names that are displayed may be formatted, spell corrected, and/or associated with appropriate visual icons.

The misspelling value may be a boolean feature to check if the trigger is a commonly misspelled form of the given brand. For example, the misspelling value may be set to true for the trigger "XY" when associated with the brand "XYZ" (e.g., a known coffee chain).

The brand query popularity score may signify how popular a given brand is among all brands that users search for in a fixed time period, such as 3 months. The brand query popularity score may be calculated as follows:

score=(number of times win is observed when trigger was classified as the given brand)/(total number of wins for a query of any brand).

The brand business popularity score may be signify the fraction of total businesses that belong to this brand. The trigger popularity score may signify how frequently users search for the given trigger in a fixed time period, such as 3 months. The trigger popularity score can be calculated as follows:

score=(number of times when a user query exactly matches the trigger)/(total number of user queries).

The conflicts with another category value may be a boolean feature to check if the given trigger is also associated with another category. The conflicting category win rate may be similar to the win rate definition applied to the conflicting category. The conflicts with chain/brand value may be a boolean feature to check if the trigger is associated with another chain/brand. The conflicting chain/brand win rate may be similar to the win rate definition applied to the conflicting chain/brand.

Moreover, the geo entity classifier may implement one or more of the following features: a geo intent win rate, a geo entity type, a geo entity popularity score, a lexical match to canonical name value, and a proximity between the geo entity and concept value.

The geo intent win rate may be determined from past search sessions, and may correspond to the fraction of times a win occurs when the trigger was classified as the geo entity type. For example, for the trigger "santa clara," this is the fraction of times that a win occurs when the trigger was classified as the geo entity type. This may be computed as follows:

win rate=(number of times win occurs when the trigger was classified as a geo entity)/(number of times this trigger was present as a part of a user query)

The geo entity type may describe whether the geo entity is a city, street name, neighborhood, state, or the like. The geo entity popularity score may signify how popular the geo entity is.

The lexical match to canonical name value may correspond to a similarity value computed (e.g., the Jaccard similarity measure) between the trigger and the canonical name of the geo entity. The unique name may be a name that uniquely identifies the concept independent of the language and trigger, and may be referred to as the canonical name. The canonical name and language may then be used to select an appropriate name for display purposes. Names that are displayed may be formatted, spell corrected, and/or associated with appropriate visual icons.

The proximity between the geo entity and concept value may correspond to a distance measure between the location of the geo entity and nearest instance of a business that is associated with the concept to which this trigger belongs. For example, the distance may be computed between the center of the city of Santa Clara in USA to the physical location of the nearest business that belongs to the chain (of ice cream shops) called "Santa Clara" in Mexico.

Figure 6:
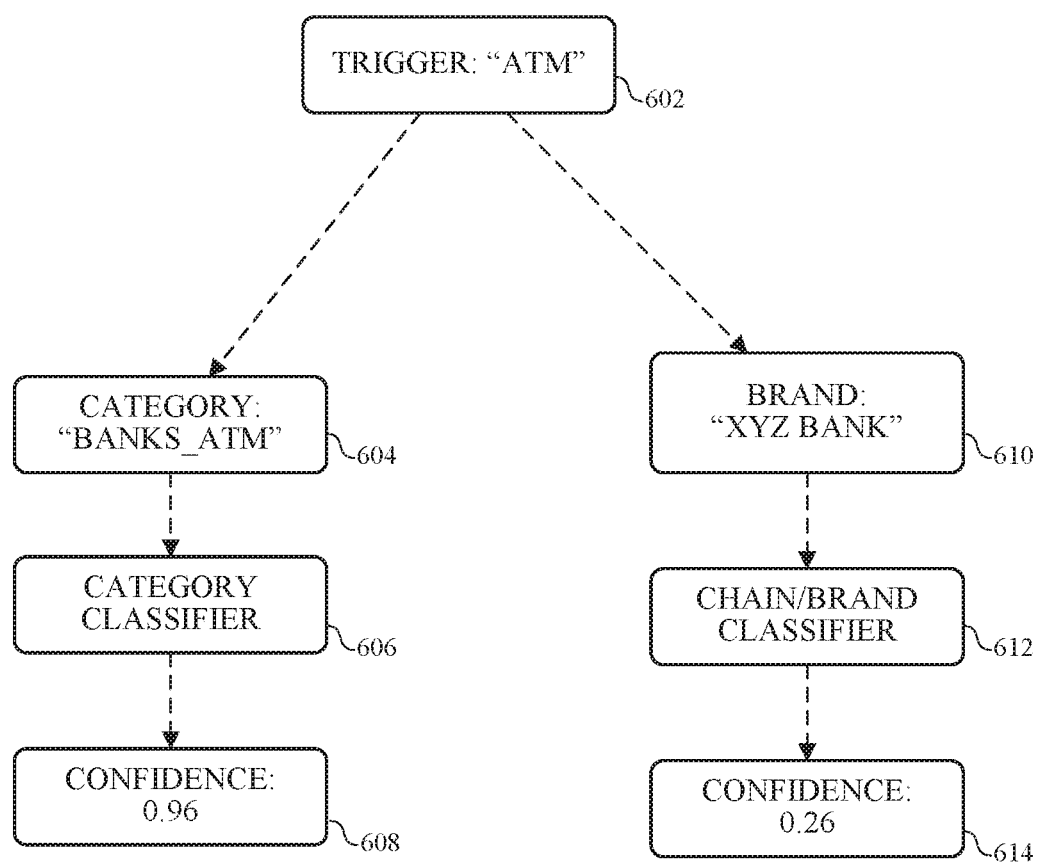
FIG. 6 illustrates a block diagram of an example of conflict resolution for conflicting triggers in accordance with one or more implementations.

Thus, the conflict resolution module 308 trains and uses learning classifiers configured to output a confidence score indicating how strongly a trigger is associated with a given tag type. In this regard, FIG. 6 illustrates a block diagram of an example of conflict resolution for conflicting triggers in accordance with one or more implementations. In this example, the conflict resolution module 308 trains a category classifier (606) and a chain/brand classifier (612), e.g., using click logs. These classifiers are used to resolve the trigger "atm" (602), which is associated with the "category" type and the "chain" type. With respect to the "category" type and the term "banks_atm" (604), the category-based machine learning classifier (606) may output a confidence score of 0.96 (608). On the other hand, for the "brand" type and the term "XYZ bank" (610), the chain/brand based machine learning classifier (612) may output a confidence score of 0.26 (614). Thus, there may be a stronger association with the category "banks_atm" than the brand "xyz bank."

Figure 7:
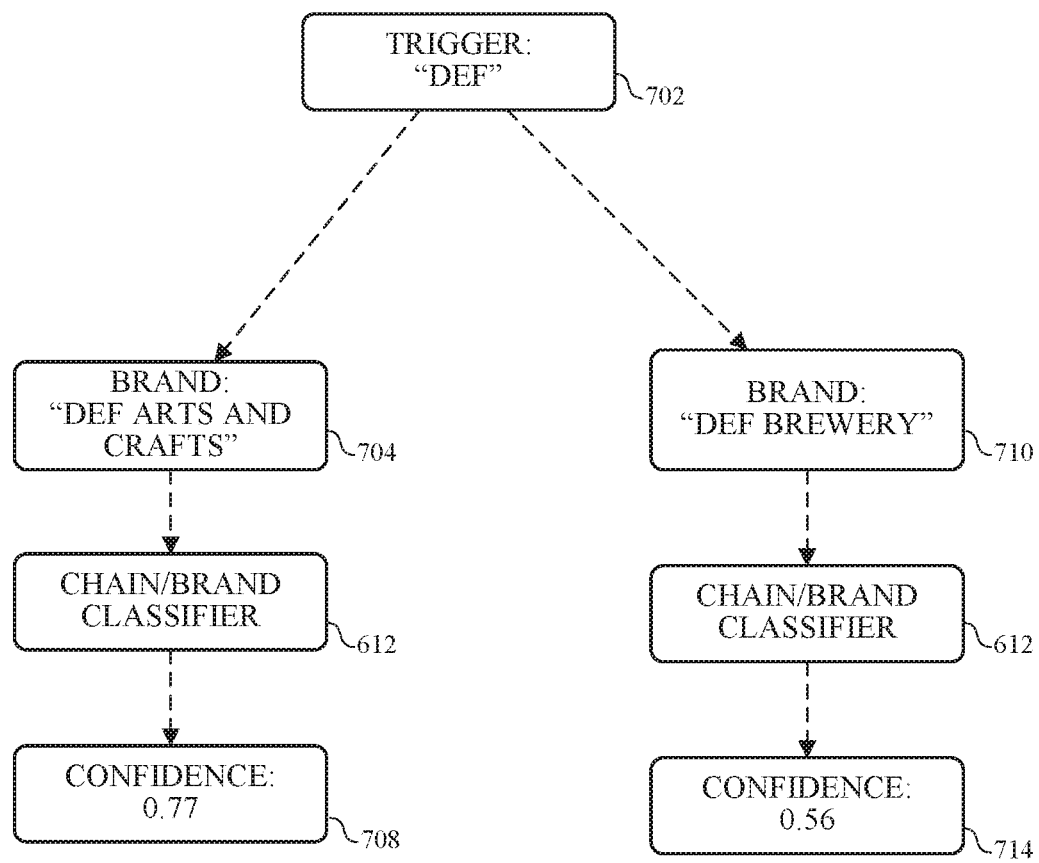
FIG. 7 illustrates a block diagram of another example of conflict resolution for conflicting triggers in accordance with one or more implementations.

FIG. 7 illustrates a block diagram of another example of conflict resolution for conflicting triggers in accordance with one or more implementations. In the example of FIG. 7, the conflict resolution module 308 further trains the chain/brand classifier (612). This classifier is used to resolve the trigger "DEF" (702), which is associated with the two different brands. With respect to the first brand type and the term "DEF Arts and Crafts" (704), the chain/brand based machine learning classifier (612) may output a confidence score of 0.77 (708). On the other hand, for the second brand type and the term "DEF Brewery" (710), the chain/brand based machine learning classifier (612) may output a confidence score of 0.56 (714). Thus, there may be a stronger association between the brand "DEF Arts and Crafts" than the brand "DEF Brewery."

Figure 8:
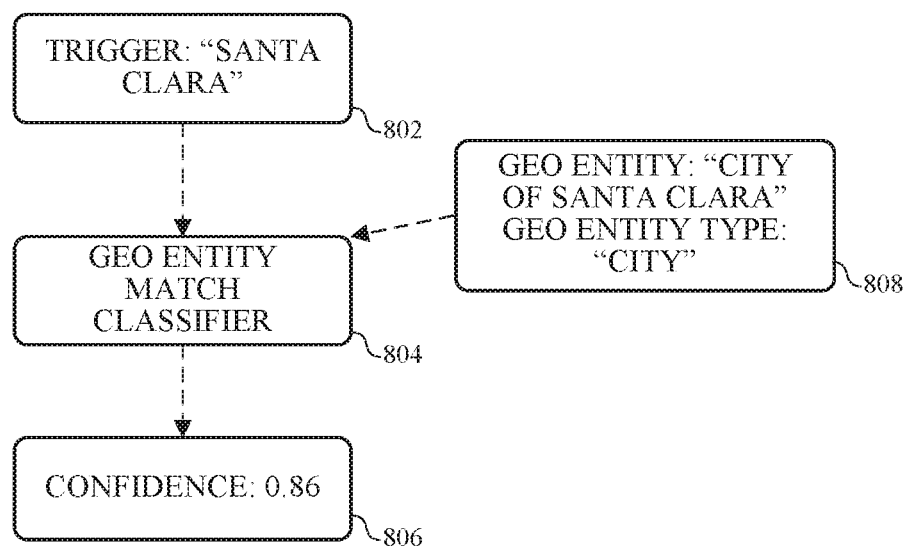
FIG. 8 illustrates a block diagram of another example of conflict resolution for conflicting triggers in accordance with one or more implementations.

FIG. 8 illustrates a block diagram of another example of conflict resolution for conflicting triggers in accordance with one or more implementations. Another conflict may occur when a trigger closely matches a geographical entity, such as the name of a city. For example, "Santa Clara" may be a trigger for a chain of ice cream shops called "Santa Clara" in Mexico. This may conflict with the city "Santa Clara" in California, USA. To identify such entities, the conflict resolution module 308 may train another classifier (e.g., geo entity match classifier (804)) that outputs a confidence for how closely a trigger matches a popular geographical entity. Triggers in the dictionary are checked against a set of names of geographical entities (e.g., city names, popular street names, neighborhoods) and any trigger whose tokens partially match the entries in set of names are identified. These are candidates input into the geo entity match classifier (804).

In the example of FIG. 8, the trigger "Santa Clara" (802) is fed into the geo entity match classifier (804), together with the geo entity "city of Santa Clara" and geo entity type "city" (808), The geo entity match classifier (804) may output a confidence score of 0.86 (806), indicating a strong association between "Santa Clara" and the "city of Santa Clara."

Figure 9:
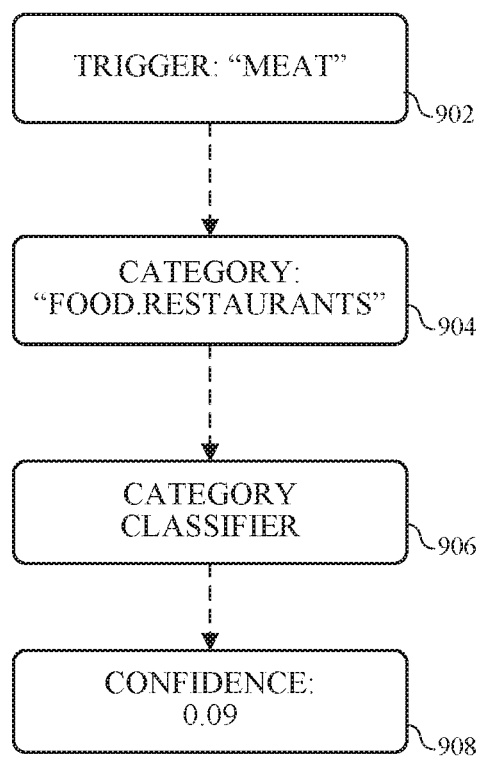
FIG. 9 illustrates a block diagram of another example of conflict resolution for conflicting triggers in accordance with one or more implementations.

FIG. 9 illustrates a block diagram of another example of conflict resolution for conflicting triggers in accordance with one or more implementations. In some cases, triggers may not be relevant to given concept. For example, a trigger "meat" may be associated with the category type "food.restaurants." However, this may lead to bad results like vegan restaurants and/or bakeries being returned for the query "meat." To identify such poor quality triggers, triggers and concept pairs (e.g., the category type pair "food.restaurants") in the dictionary are passed through the above set of classifiers to obtain confidence scores for their association.

In the example of FIG. 9, the trigger "meat" (902) corresponds to the category "food.restaurants" (904), which are fed into the category classifier (606). The category classifier (606) may output a low confidence score of 0.09 (908).

As noted above with respect to FIG. 3, the geographical knowledge graph generator further includes a concept enrichment module 310. In one or more implementations, the concept enrichment module 310 supplements the dictionary generation module 306 and the conflict resolution module 308, by capturing geographic nuances associated with low confidence triggers.

For example, the geo entity classifier may assign a poor score (e.g. a low confidence score) to the trigger "santa clara" and its association to a chain of ice cream shops with the same name in Mexico. However, a user in Mexico within the vicinity of a business belonging to this chain may prefer to see the business result. Showing the user in Mexico a result of Santa Clara city (which is very far away and not popular given the user's present location) is not optimal. In the rest of the world though, as indicated by the geo entity classifier score, the association of this trigger to the ice cream chain would have a very low probability. To improve relevance of the results, the concept enrichment module accounts 310 for situations in which associations that are typically given a low confidence are still valid and/or useful in certain locations. Thus, the concept enrichment module 310 may use past search logs, and compute all geohashes of a threshold length (e.g., length 4) where strong evidence was observed for a trigger and concept association to be valid. These geohashes may then be used as additional evidence by any model that uses the dictionary.

Further, in one or more implementations, the concept enrichment module 310 may be configured to capture phonetic variants to handle misspellings. More specifically, using a phonetic encoder, the concept enrichment module 310 may capture all possible pronunciations of a trigger and associate them to the corresponding concept. For example, an example for a variant of "XYZ Coffee" is "XY Coffee."

Moreover, in one or more implementations, the concept enrichment module may be configured to generate the plural forms of triggers (which are typically referred in the singular form). The concept enrichment module 310 may generate and associate these plural forms with the corresponding singular form of the trigger.

Referring to FIG. 3, the geographical knowledge graph generator 304 further includes a weighted finite state transducer (WFST) generation module 312, which generates a concept WFST 316, a POI WFST 318 and a geo WFST 320, to form the geographical knowledge graph 322. The WFST generation module 312 may generate the geographical knowledge graph 322 (which includes WFSTs 316-320) based on the dictionary generated by the dictionary generation module 306, as supplemented by the conflict resolution module 308 and the concept enrichment module 310.

Each of the WFSTs 316-320 within the geographical knowledge graph 322 corresponds to an automaton for supporting efficient storage and retrieval for complete and/or incomplete queries. Specifically, each of WFSTs 316-320 can be considered an extension of a regular Finite State Automaton (FSA) and be defined by: an alphabet; a set of states, one of which is the initial/start; a set of transition between states; a subset of states known as final states; and/or output alphabets for each transition and weights to the arcs.

One example advantage provided by WFSTs (e.g., 316-320) is improved search and autocomplete. The WFST technology works for both complete and incomplete queries, making it a common framework for search and autocomplete services. Another example advantage provided by provided by WFSTs is more efficient storage. WFSTs may be built with a high degree of minimization, such that common prefixes, infixes and suffixes do not need to be stored in a redundant manner. This enables storage of large scale local search data in an optimized manner.

Yet another example advantage provided by WFSTs is efficient retrieval. The core match and completion phases of the retrieval result in sub-millisecond latencies, which make it possible to perform searches within the tight latency budget (supporting a round-trip for every keystroke) for a service like autocomplete. For example, since autocomplete suggestions have relevance as a user is typing, the autocomplete suggestions need to be determined and provided with minimal latency. Another example advantage provided by WFSTs is extensibility. A WFST has potential to be extended to fit the local search use-cases such as supporting spatial search, adding language-specific filters (to limit the retrieved candidates), as well as forming logical connections between separate WFSTs to support different varieties of local search queries.

In one or more implementations, the geographical knowledge graph generator 304, including the dictionary generation module 306, the conflict resolution module 308, the concept enrichment module 310 and the WFST generation module 312, and the geographical knowledge graph 322 (including the WFSTs 316-320), are implemented as software instructions, stored in the memory 204, which when executed by the host processor 202, cause the host processor 202 to perform particular function(s), and/or are implemented in hardware.

In one or more implementations, one or more of the geographical knowledge graph generator 304, the dictionary generation module 306, the conflict resolution module 308, the concept enrichment module 310, the WFST generation module 312 and the geographical knowledge graph 322 (including the WFSTs 316-320) may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 10:
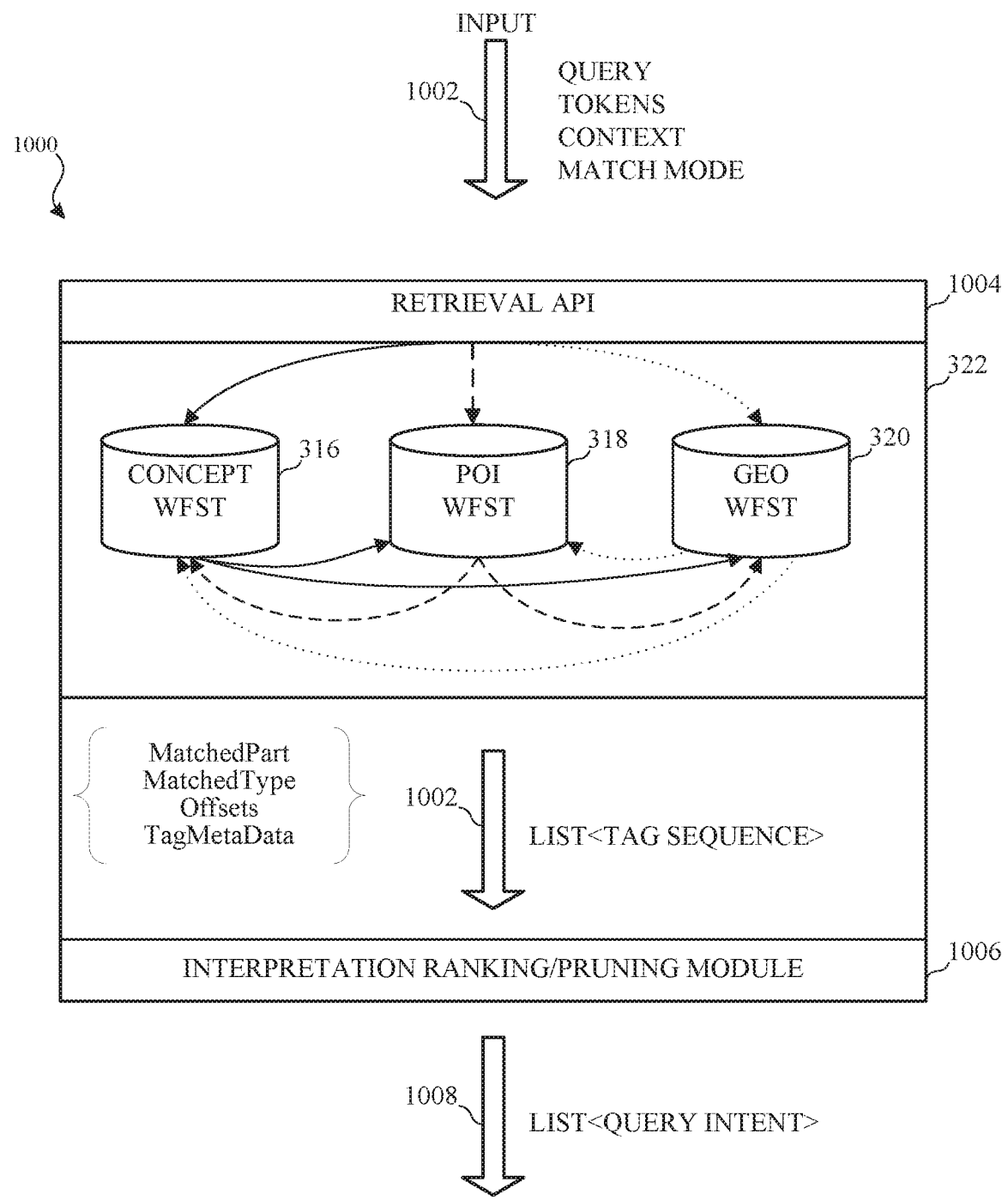
FIG. 10 illustrates an example architecture which utilizes a geographical knowledge graph for facilitating the providing of completion suggestions and/or search results based on a map-based query.

FIG. 10 illustrates an example architecture which utilizes the geographical knowledge graph 322 for facilitating the providing of completion suggestions and/or search results based on a map-based query. For example, the architecture 1000 can be implemented by one or more software modules running on the host processor 302 of the server 106. In another example, the architecture 1000 can be implemented by one or more software and/or hardware modules implemented by custom hardware (e.g., one or more coprocessors) configured to execute the functionality. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In one or more implementations, the architecture 1000 includes a retrieval application programming interface (API) 1004, the geographical knowledge graph 322 (including the WFSTs 316-320), and the interpretation ranking/pruning module 1006. The retrieval API 1004 receives input 1002 in the form of at least a portion of a map-based search query, and employs the previously-generated geographical knowledge graph 322 in order to produce a list of plural interpretations (e.g., combinations of tagging the tokens of the query). The interpretation ranking/pruning module 1006 ranks and/or prunes the list of interpretations, to generate a revised list of interpretations as output 1008, with the revised list more closely matching user intent.

With respect to the input 1002, the server 106 may receive at least a portion of a map-based search query from one of more of the electronic devices 102-104 (hereinafter the electronic device 102, for purposes of this example). The received map-based search query may include plural tokens (or terms), where each token can be tagged as a type (e.g., a concept type such as a chain/brand, category, attribute or proximity, a POI type, or a neo type). In one or more implementations, at least a portion of a query may be identified as being map-based on the basis of having been received through a map application, a map web page, and/or another known search interface with geographic context.

The server 106 may further receive context data. The context data may include location data, which can correspond to one or more of the device location (e.g., the physical location of the electronic device 102) and/or viewport location (e.g., the location displayed on a viewport window of the electronic device 102, such as when the electronic device 102 is displaying a map).

The context data may further include a language associated with the electronic device 102. In one or more implementations, the input may further include a match mode, corresponding to whether autocomplete functionality is enabled on the electronic device 102. Thus, the input 1002 may include the map-based search query (consisting of its plural tokens), together with one or more of a device location, a viewport location, a language, and a match mode.

Figure 11:
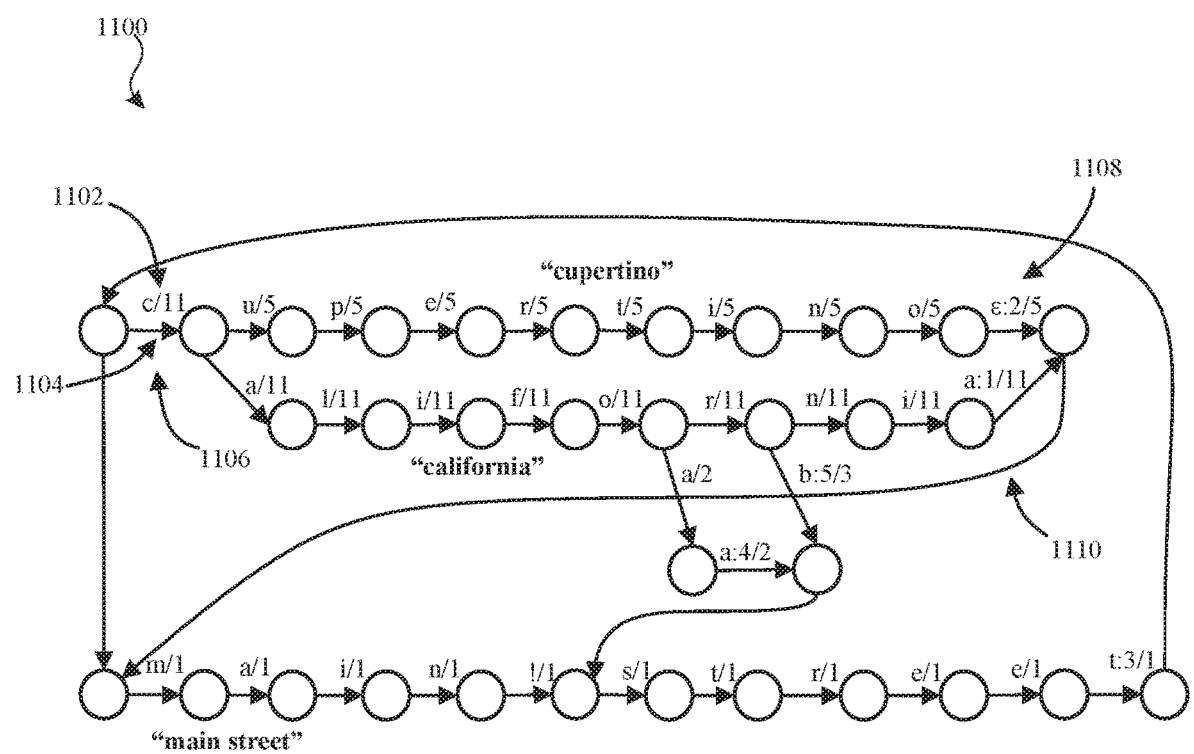
FIG. 11 illustrates an example weighted finite state transducer in accordance with or more implementations.

FIG. 11 illustrates a simplified graphical representation of a WFST 1100 with three entities (Cupertino, Calif. and Main Street in Cupertino). Every entity has a pre-computed weight associated with it which is a function of its popularity. As part of building the structure, the weights are back propagated from the final state to the start state, with every ancestor arc using the "max" of the weights of its children arc. For example, this is illustrated with the first symbol "c" between Cupertino and California in FIG. 11.

In one or more implementations, reference 1102 represents an example format of <input_symbol>/<weight> for a node within the WFST 1100. Reference 1104 represents an example of calculating weight as follows:

$$\text{weight}(c) = \max(\text{weight}(u), \text{weight}(a)) = \max(5,11) = 11.$$

Reference 1106 represents an example prefix minimization, for the symbol (c). Reference 1108 represents an example format of <input_symbol><output_symbol>/<weight>. In addition, reference 1110 represents an example logical connection between "main street" and its interactions with "cupertino" and "california."

The core functionality of the retrieval API 1004 is to generate candidate interpretations using the concept WFST 316, the POI WFST 318 and the geo WFST 320, which form the vocabulary for map-based searching. The retrieval API 1004 will be described with reference to FIG. 12, which illustrates an example of retrieving candidate interpretations for a search query in accordance with one or more implementations.

Figure 12:
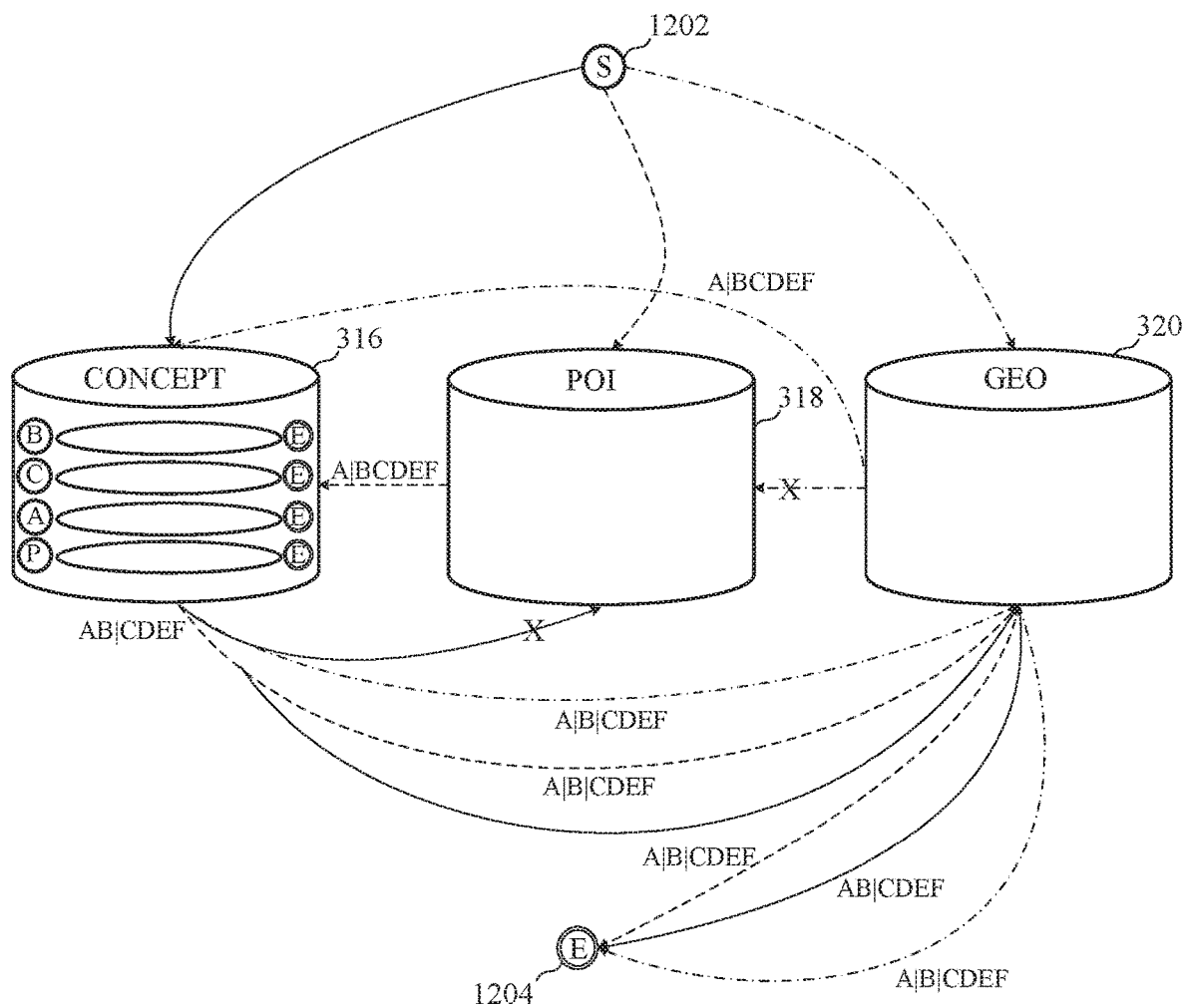
FIG. 12 illustrates an example of retrieving candidate interpretations for a search query in accordance with one or more implementations.

As shown in FIG. 12, each of the WFSTs 316-320 (which are included within the geographical knowledge graph 322) may be treated as a logical node in a graph connected to a global start state 1202 and an end state 1204. Therefore, one problem of interpretation generation is essentially transformed to a graph traversal problem, taking all valid paths from the start state 1202 to the end state 1204.

In the example of FIG. 12, the search term "XYZ near anza blvd cupertino" is considered. For example, "XYZ" may be the name of a popular coffee chain. Each of the tokens "XYZ," "store," "near," "anza," "blvd," and "cupertino" are illustrated as tokens A-F for example purposes. FIG. 12 illustrates the valid paths for the partitioning of tokens A-F. Moreover, as shown in FIG. 12, the concept WFST 316 includes respective WFSTs for each of the brand name (illustrated as "B"), category ("C"), attribute ("A") and proximity ("P") classifiers.

A "valid" path may be considered as one that goes through each node and generates a valid tagging for the input query. As discussed above, tokens can be tagged by one or more of the following: a concept such as a brand name, a category, an attribute, or a proximity; a point of interest; and a geographical entity.

Every node essentially generates possible tagging for parts of the query, and the untagged portions are then passed on to the remaining nodes in the path. As a result, a query could match one or more sequence of tags generating multiple interpretations of the same query. These interpretations are assigned with a confidence score to indicate the relevance of each of them based on context and relevant entity properties.

In one or more implementations, a subset of multi-entity queries are ones with an explicit location intent. Some example classes of such queries include, but are not limited to: POI+GEO or GEO+POI; CONCEPT+GEO or GEO+CONCEPT; and POI+CONCEPT+GEO. Such queries typically consist of the following components (in no particular order, apart from the partition): "SEARCH PHRASE"+["PARTITION"]+"CONTAINMENT."

The concept WFST 316 may determine which of its respective WFSTs (brand name "B," category "C," attribute "A" or proximity "P") applies to a given match. The respective WFSTs may be searched in serial and/or two or more of the WFSTs may be searched in parallel. In one or more implementations, the leaf nodes in each of the WFSTs (brand name "B," category "C," attribute "A" or proximity "P") contain unique identifiers which may be used to retrieve tag details of the match, e.g., using a key-value pair like data structure. Values in this data structure may contain information such as the type of the concept (e.g., brand name; category, attribute, proximity), popularity scores (e.g., trigger popularity, concept popularity), misspelling values, and the like. One or more of these values may be signals used in interpretation ranking.

The "search phrase" corresponds to the primary entity being searched for in the query. The "partition" is an optional component, and is typically used to make an explicit partitioning between the search term and the containment. The "partition" also provides the strictness of the containment, for example, whether the search term should strictly be within or around the containment (typically a proximity token). The "containment" provides the explicit location hint and the primary entity (search phrase) is expected to be around the containment.

In one or more implementations, one basic assumption with such queries for the autocomplete use case (e.g., for completion suggestion(s)) is that all but the last component (either the containment or the search phrase) be complete. Otherwise, it may be difficult to predict what the user is looking for, and whether it is even an explicit location intent query.

Two examples will now be described, based on whether the search query includes a partition. The first example describes the case where the search query includes a partition. In this case, finding the intent transitions are based on a predefined "proximity" partition between the search phrase and the containment. With respect to the candidates for containment, a regular generator invocation may be used to return candidates sensitive to the user's location context in addition to returning global containments. Depending on the paths taken in the knowledge graph, the containment may precede or succeed the search term and it may represent a business or an address.

Given the candidates for the containment, the primary entity (namely the search phrase) may be searched with geohashes around the containment location. In this regard, the precision of the geohashes may depend on the granularity of the containment (e.g., for streets, it will likely be much more precise than for neighborhoods or cities).

The second example describes a case in which the search query does not include a partition. In this case, finding the intent transition may not be straightforward, since there is no explicit proximity token. Therefore, the partial matching abilities of the match algorithm may be used to produce partial matches within the query with each of the WFSTs 316-320. Again, depending on the paths taken in the geographical knowledge graph 322, the entity may be a business, an address or a concept. Once candidate partial matches are found, the retrieval API 1004 transitions to the next nodes in the WEST in order to complete the remaining part of the query (e.g., regular autocomplete match mode). If a match is found, then the match may either act as a containment or as the search term (e.g., depending on the path taken in the graph). It is noted that this phase does not need to be a full search. At this point, the retrieval API 1004 is primarily interested in tags, and the match algorithm can operate in a much more stripped down manner so as to not enumerate all possible matches at a given query offset.

Similar to the case in which there is a partition, a regular generator invocation may be used to return candidates sensitive to the user's location context in addition to returning global containments. Depending on the paths taken in the geographical knowledge graph 322, the containment may precede or succeed the search term and it may represent a business or an address. Similar to the case in which there is a partition, given the candidates for the containment, the primary entity (namely the search phrase) may be searched with geohashes around the containment location. In this regard, the precision of the geohashes may depend on the granularity of the containment (e.g., for streets, it will likely be much more precise than for neighborhoods or cities).

Referring to FIG. 10, the interpretation ranking/pruning module 1006 produces a ranked/pruned list of interpretations matching user intent, based on initial list of plural interpretations (e.g., combinations of tagging the terms/tokens of the query) determined by the retrieval API 1004, In doing so, the interpretation ranking/pruning module 1006 assigns a relevance score to interpretations generated by the retrieval API 1004. The interpretation ranking/pruning module 1006 further prunes irrelevant and/or low confidence interpretations, so that valid interpretations may be passed downstream, for example, to a search service in order to obtain a ranked list of completion suggestion(s) and/or search results.

In one or more implementations, the interpretation ranking/pruning module 1006 uses offline training data generation, More specifically, in order to compute a confidence score for each interpretation generated by the interpretation generation process, a supervised machine learned ranker model may be employed. This ranker model requires training data to learn the weights for the features provided. The training data generation process is automated based on user provided feedback in the form of click logs (e.g., click logs 302). Moreover, further pruning and refining is performed.

For each query in a context in history, a record is created to save user interaction for the query in the context. For example, each record in the click logs 302 may include information such as sequence of entities detected for the query, results generated/retrieved based on the sequence of tags and the ID of the entity which the user performed an activity on (e.g., click/navigate, look for the information of the entity, or call the business).

Per the click logs, for each record where the user showed interest in an entity (POI/Address), the machine ranker model obtains the sequence of tags recorded. User logs from history are obtained where there was an indication by the user that the shown results were good. In addition, based on the recorded POI/Address Ds, all information about that particular POI/Address may be retrieved.

For winning intent, query tokens are matched with a corresponding value in business. For example, for the query "coffee sunnyvale," if the intent is "CATEGORY_GEO," coffee as a category is looked for in the category section of the POI that was clicked. In addition, "Sunnyvale" is looked for in the address section of the business that was clicked. If all of the values are found within, for example, a "Demarau Edit distance of 1," (e.g., where Demarau Edit corresponds to a string metric for measuring the edit distance between two sequences) the user log is considered as a good training example for the given intent.

In addition to offline training data generation, the interpretation ranking/pruning module 1006 employs a "featurization." As discussed above, a query consists of one or more sequence of tokens, where one or more tokens represent a specific intent of the user. Hence, a query can have one or more interpretations based on the sequence of intent the query might map to. These interpretations are obtained from the geographical knowledge graph 322. Each interpretation is a sequence of intent that was matched by traversing the WFSTs 316-320, conditioned on the context of the search executed by the user.

For each interpretation, the interpretation ranking/pruning; module 1006 collects features of the interpretation that might be representative in ranking the relevance of interpretation for the user. Each interpretation may go through the "featurization" process, where values are calculated for predefined features. The features may be query based, context based or relevant POI/Address based.

In this regard, different features are described below. An interpretation I is defined as follows:

I=$t_1, t_2, t_3, t_4, \ldots t_n$, where $t_1$ through $t_n$ are sequences of tags generated based on tokens in a query Tag T is defined as an object that consists of attributes such as trigger and intent. For example,

```
Tag{
trigger = XYZ,
intent = CHAIN,
id = XYZ.com
}
```

For example, for a query of "24 hour XYZ coffee near Sunnyvale, Calif.", one of the interpretations may be:

I=24_ATTRIBUTE hour_ATTRIBUTE x_CHAIN coffee_CATEGORY near_PROXIMITY Sunnyvale_GEO CA_GEO Example feature values may be determined for one or more of the following: tag collocation feature values, entity collocation feature values, domain click through rate (DCTR) feature values, intent click through rate (ICTR) feature values, distance feature values, popularity feature values, lexical similarity feature values, query feature values, document feature values, and context feature values.

The tag collocation feature values may represent co-occurrence patterns of the probability of two identifiers (ids) of tags in an interpretation. These feature values may be computed as normalized pointwise mutual information (NPMI) of two tag ids.

Example formulas for the NPMI of two tag ids are shown below. The parameters may be defined as: x=frequency of occurrence of tag1.id in the corpus of interest; y=frequency of occurrence of tag2.id in the corpus of interest; xAndY=frequency of occurrence of tag1.id and tag2.id in the same interpretation in the corpus of interest; totalRecords: total number of queries in the corpus of interest. Thus:

$$PMI(tag1, tag2) = \frac{Log(xAndY * totalRecords)}{x * y}$$

$$entropy(tag1, tag2) = -\frac{Log(xAndY)}{totalRecords}$$

$$NPMI(tag1, tag2) = \frac{PMI(tag1, tag2)}{entropy(tag1, tag2)}$$

The tag collocation feature values may have two variations, namely, local and global. The global values are calculated when logs of interest could have occurred anywhere in the world, given parameters such as language match. The local values are calculated when user location or viewport of the user matches with user logs of interest.

The entity collocation feature values may represent characteristic co-occurrence patterns of a sequence of tokens corresponding to their tags in a given candidate interpretation. For example, the entity collocation feature values track the order of tokens whereas the tag collocation value do not. The entity collocation feature values may be calculated as a language model of a sequence of tokens and their corresponding tags. A language model is a probability distribution over a sequence of items of interest. A generalized bigram language model can be used to obtain an overall language model score. For example, a simple conditional probability based n-gram language model can be defined as:

$$p(wi/wi-(n-1), \ldots, wi-1) = \frac{count(wi-(n-1), \ldots, wi-1, wi)}{count(wi-(n-1), \ldots, wi-1)}$$

As an example of language model generation for the above interpretation example, a start and end tag can be added to indicate the beginning and end of the interpretation. Similar to the tag collocation feature values, the entity collocation feature values may have global and local variations. The interpretation is shown below:

$I$=start_START 24_ATTRIBUTE hour_ATTRIBUTE xyz_CHAIN coffee_CATEGORY near_PROXIMITY Sunnyvale_GEO CA_CEO end_END $P$(24_ATTRIBUTE, hour_ATTRIBUTE, xyz_CHAIN, coffee_CATEGORY near_PROXIMITY, Sunnyvale_GEO CA_GEO)=Log($P$(24_ATTRIBUTE/start_START))+Log($P$(hour_ATTRIBUTE/24_ATTRIBUTE))+Log($P$(xyz_CHAIN/hour_ATTRIBUTE))+Log($P$(coffee_CATEGORY/xyz_CHAIN))+Log($P$(near_PROXIMITY/coffee_CATEGORY))+Log($P$(Sunnyvale_GEO/near_PROXIMITY))+Log($P$(CA_GEO/Sunnyvale_GEO))

The domain click through rate (DCTR) feature values may represent the ratio of a query or part of a query being classified as a GEO (e.g., address) or a POI, when the user has shown some interest in the result retrieved based on this classification in terms of interaction with the result. For example, in the local search scenario, the two main domains of geo and POI may be considered. The address is a pure address of a location, whereas the POT is a specific location where the user might find things of interest. The address may need to be unique in itself, whereas the POI may have multiple locations where the same interest can be fulfilled. Domain CTRs may have local and global variations. The POI CTR of a trigger can be defined as follows:

$$CTR(POI) = \frac{count(\text{user intersacted results when trigger was classified as } POI)}{xcount(\text{user intersacted results when trigger was classified as } GEO)}$$

$$CTR(GEO) = \frac{1}{CTR(POI)}$$

The intent click through rate (ICTR) feature values may represent, for each intent, the ratio of user query success when a query or part of a query was classified as a given intent and corresponding retrieved result was interacted by users. As noted above, the POI is a more complex location since it can be represented in multiple ways. POIs can be grouped into a broader type based their category belonging, or POIs can be grouped based on their parent organization such as chains in multiple locations. The CTR for an intent may be defined as follows:

$$CTR(\text{Intent}) = \frac{count(\text{user intersacted results when trigger was classified as given INTENT})}{xcount(\text{user intersacted results when trigger was classified as other INTENTS})}$$

Hence, intent of the user may be further defined for POI searches into more granular values. For example, a name intent value may represent a pure name match or a synonym name match of a POI, e.g., "Paula's flower shop" or "Golden gate bridge." A category intent value may represent a category match of a POI, e.g., gas, food, coffee. A chain intent value may represent a group match of a POI to which it belongs to, e.g., "xyz" (a popular coffee chain). An attribute intent value may represent attributes of a POI that describes the property of POI, e.g., 24 hour, drive through. A proximity intent value may represent an additional location hint provided by the user, e.g., "near me" or "around." A geo intent value may represent the location component of a POI. A combination intent value may represent a combination of the above intent feature values in any order that makes sense, e.g., geo category: Sunnyvale coffee. Intent CTRs also have local and global variations.

The distance feature values may represent one or more of the closest, mean, farthest, and/or variation of distances of POIs and/or GEOs that match the candidate intent criteria. The distance feature values may be represented in absolute numbers and in buckets in terms of log of absolute number. Buckets of distance feature values represent enumeration in terms of close, medium, far, very far, or the like.

The popularity feature values may represent the popularity of POI/GEO of interest. For example, popularity value may be defined in terms of the frequency of user searches in a period of interest. The popularity feature values may be used as absolute feature values or bucketized to get enumerations similar to the distance feature values. These popularity feature values may also consider the popularity of a trigger to the intent, since some triggers might be very popular whereas some others might not. As an example, the trigger "gas station" might be very popular for category "gas_station" whereas some other triggers "gas shop" may not be.

The lexical similarity feature values may represent textual similarity of part of query that maps to candidate intent. The lexical similarity feature values may be calculated in terms of character dissimilarity in two texts of interest in terms of edit-distance/Jaccard distance, or calculated with semantic similarity based on word or sequence of word embeddings (obtained from deep neural networks) in terms of cosine similarity.

The query feature values may correspond to a group of boolean flags, such as, but not limited to whether: a query is misspelled, a query is an abbreviation, a query is compounded/decompounded, a query contains location hint, a query is a local navigational query to a particular POI (e.g., which typically means the same POI), a query is a global navigational query to a particular POI (e.g., which typically means the same POI), or the length of the query.

The document feature values may be precomputed values related to POI/geo of interest. The document feature values may be represented in terms of double or boolean values such as but not limited to: category of POI, type of geo, user ratings of POI, and POI is a landmark, airport.

The context feature values may represent the context of the user. The context feature values may include, but are not limited to: user location, language preference, and view-port of the user.

Thus, in view of all the features mentioned above, the interpretation ranking/pruning module 1006 uses a supervised learning algorithm to produce a ranking model to combine all the features and obtain a composite relevance score for each interpretation. Based on the score, interpretations are then sorted by relevance, and the top N interpretations are used for recall purpose.

For ranking, the interpretation ranking/pruning module 1006 may use variations of a gradient boosted decision tree based pairwise ranking algorithm. Gradient boosted models are an ensemble of prediction/ranking models which when combined produce a strong relevance indication. Gradient boosting methods may be used with tree based methods. Multiple variations of the tree such as size of the tree and depth of the tree may be predicted with multiple iterations and optimal numbers are used for ranking purpose. A pairwise learning algorithm is used to rank interpretations since comparison of each interpretation matters in ordering of interpretations. Typically, as a training data, relative order of relevance for candidate interpretations are provided to the learning model so that it iteratively learns to compare pair of interpretations exhaustively. For example, this may be important since two interpretations might be equally important since they are highly ambiguous even to human evaluators.

For purposes of ranking, each training instance is represented in terms of a vector of size N where each element in the vector represents a feature. Similarly, in runtime, a request with its context is converted to a feature vector. The list of feature vectors corresponding to each interpretation of a query is an input to learnt model which in turns returns back scores for each interpretation. In one or more implementations, the interpretations that compose top x % (example 90%) of confidence may be considered as eligible interpretations for a query.

Thus, the interpretation ranking/pruning module 1006 generates a revised list of interpretations based on the offline data generation and featurization described above. The revised list of interpretations may then be passed downstream for a search service (e.g., implemented on server 106), so that the search service can provide a ranked list of completion suggestions and/or search results for sending to the electronic device 102.

In one or more implementations, the top N interpretations (where N is a variable dependent on the size of the device) with appropriate display text (e.g., misspellings corrected, the proper language chosen, and the like) may be candidate completion suggestions in an auto-complete system. These interpretations may be used to extract POIs and/or addresses from a key-value pair index, e.g., using simple structured query formation and retrieval. These results may typically be high precision results, since the underlying intent of the user is understood. As such, with the subject system, it is possible to determine which particular fields) of a document should be considered for generating the completion suggestions and/or for retrieving the results.

Referring to FIG. 10, in one or more implementations, the retrieval API 1004, the geographical knowledge graph 322 (including the WFSTs 316-320), and the interpretation ranking/pruning module 1006, are implemented as software instructions, stored in the memory 204, which when executed by the host processor 202, cause the host processor 202 to perform particular function(s).

In one or more implementations, one or more of the retrieval API 1004, the geographical knowledge graph 322 (including the WFSTs 316-320), and the interpretation ranking/pruning module 1006 may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 13:
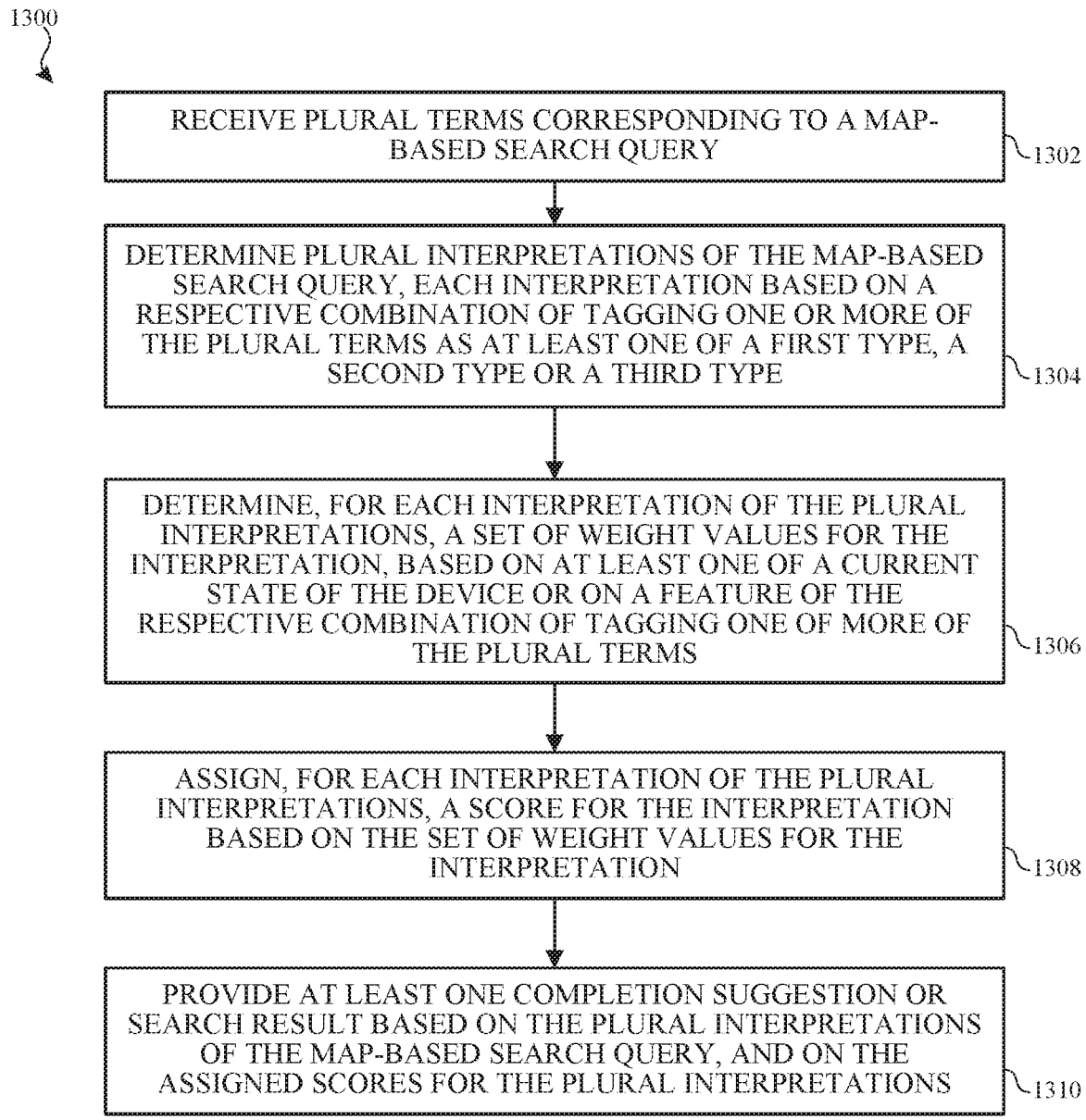
FIG. 13 illustrates a flow diagram of an example process for performing a map-based search in accordance with one or more implementations.

FIG. 13 illustrates a flow diagram of an example process for performing a map-based search in accordance with one or more implementations. For explanatory purposes, the process 1300 is primarily described herein with reference to the server 106 of FIGS. 1-2. However, the process 1300 is not limited to the server 106, and one or more blocks (or operations) of the process 1300 may be performed by one or more other components of the server 106. Further for explanatory purposes, the blocks of the process 1300 are described herein as occurring in serial, or linearly. However, multiple blocks of the process 1300 may occur in parallel. In addition, the blocks of the process 1300 need not be performed in the order shown and/or one or more blocks of the process 1300 need not be performed and/or can be replaced by other operations.

In one or more implementations, the server 106 receives plural terms (or one or more terms) corresponding to a map-based search query (1302). The server 106 determines plural interpretations of the map-based search query, each interpretation based on a respective combination of tagging one or more of the plural terms as at least one of a first type, a second type or a third type (1304).

The first type may be a concept corresponding to at least one of a brand name, a category, an attribute or a proximity. The second type may be a point of interest. Third type may be a geographical entity. The point of interest may be a predefined global point of interest for providing as the at least one completion suggestion or search result independent of device location.

The server 106 determines (e.g., using one or more machine learning models), for each interpretation of the plural interpretations, a set of weight values for the interpretation, based on at least one of context data of the device or on a feature of the respective combination of tagging one of more of the plural terms (1306). Determining the set of weight values may be performed by a machine learning model. In one or more implementations, the machine learning model may be trained using click log data.

The context data of the device may correspond to at least one of a location of the device, a geographical region of a map being displayed on the device, or a preferred language for the device. The feature may correspond to at least one of a location of a candidate result corresponding to the interpretation, or a popularity of the candidate result.

The feature may correspond to a tag collocation value, which corresponds to a frequency with which a first tag of the brand name, the category, the attribute, the proximity, the point of interest, or the geographical entity occurs with a second tag of one of the brand name, the category, the attribute, the proximity, the point of interest, or the geographical entity.

The feature may correspond to an entity collocation value, which corresponds to a frequency with which a first of the plural terms tagged as one of the brand name, the category, the attribute, the proximity, the point of interest, or the geographical entity occurs in sequence with a second of the plural terms tagged as one of the brand name, the category, the attribute, the proximity, the point of interest, or the geographical entity.

Tagging one of more of the plural terms may be based on a geographical knowledge graph which is generated from click log data. The geographical knowledge graph may comprise at least one of: a concept graph for identifying at least one of the brand name, the category, the attribute or the proximity, a point of interest graph for identifying the point of interest, or a geography graph for identifying the geographical entity. Each of the point of interest graph, the concept graph, and the geography graph may be implemented as a weighted finite state transducer which analyzes terms on a per-character basis.

The server 106 assigns, for each interpretation of the plural interpretations, a score for the interpretation based on the set of weight values for the interpretation (1308). The server 106 provides at least one completion suggestion or search result based on the plural interpretations of the map-based search query, and on the assigned scores for the plural interpretations (1310).

Figure 14:
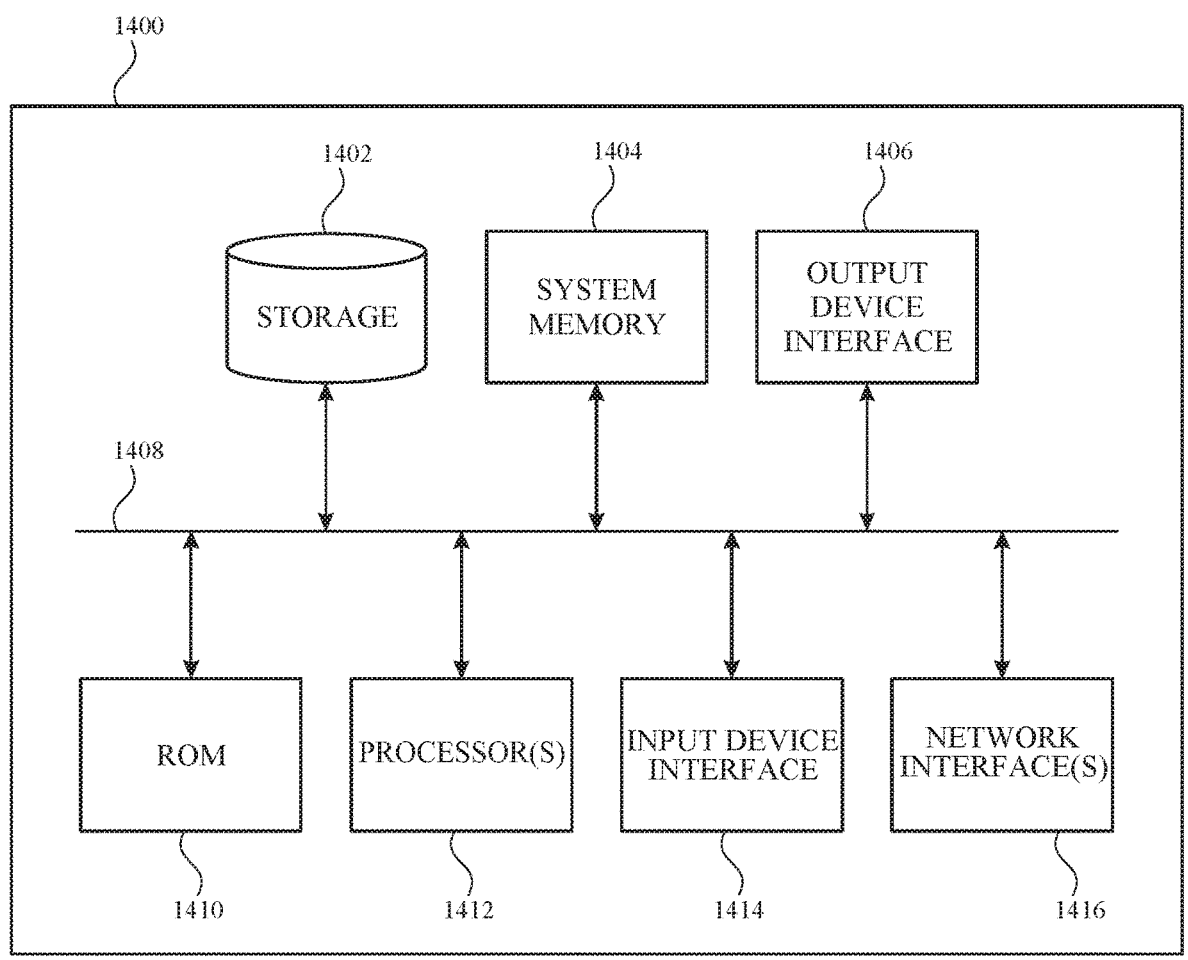
FIG. 14 illustrates an example electronic system with which aspects of the subject technology may be implemented in accordance with one or more implementations.

FIG. 14 illustrates an electronic system 1400 with which one or more implementations of the subject technology may be implemented. The electronic system 1400 can be, and/or can be a part of, one or more of the electronic devices 102-104, and/or the server 106 shown in FIG. 1. The electronic system 1400 may include various types of computer readable media and interfaces for various other types of computer readable media. The electronic system 1400 includes a bus 1408, one or more processing unit(s) 1412, a system memory 1404 (and/or buffer), a ROM 1410, a permanent storage device 1402, an input device interface 1414, an output device interface 1406, and one or more network interfaces 1416, or subsets and variations thereof.

The bus 1408 collectively represents all system, peripheral, and chipset buses that communicatively connect the numerous internal devices of the electronic system 1400. In one or more implementations, the bus 1408 communicatively connects the one or more processing unit(s) 1412 with the ROM 1410, the system memory 1404, and the permanent storage device 1402. From these various memory units, the one or more processing unit(s) 1412 retrieves instructions to execute and data to process in order to execute the processes of the subject disclosure. The one or more processing unit(s) 1412 can be a single processor or a multi-core processor in different implementations.

The ROM 1410 stores static data and instructions that are needed by the one or more processing unit(s) 1412 and other modules of the electronic system 1400. The permanent storage device 1402, on the other hand, may be a read-and-write memory device. The permanent storage device 1402 may be a non-volatile memory unit that stores instructions and data even when the electronic system 1400 is off. In one or more implementations, a mass-storage device (such as a magnetic or optical disk and its corresponding disk drive) may be used as the permanent storage device 1402.

In one or more implementations, a removable storage device (such as a floppy disk, flash drive, and its corresponding disk drive) may be used as the permanent storage device 1402. Like the permanent storage device 1402, the system memory 1404 may be a read-and-write memory device. However, unlike the permanent storage device 1402, the system memory 1404 may be a volatile read-and-write memory, such as random access memory. The system memory 1404 may store any of the instructions and data that one or more processing unit(s) 1412 may need at runtime. In one or more implementations, the processes of the subject disclosure are stored in the system memory 1404, the permanent storage device 1402, and/or the ROM 1410. From these various memory units, the one or more processing unit(s) 1412 retrieves instructions to execute and data to process in order to execute the processes of one or more implementations.

The bus 1408 also connects to the input and output device interfaces 1414 and 1406. The input device interface 1414 enables a user to communicate information and select commands to the electronic system 1400. Input devices that may be used with the input device interface 1414 may include, for example, alphanumeric keyboards and pointing devices (also called "cursor control devices"). The output device interface 1406 may enable, for example, the display of images generated by electronic system 1400. Output devices that may be used with the output device interface 1406 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 14, the bus 1408 also couples the electronic system 1400 to one or more networks and/or to one or more network nodes, such as the electronic devices 102-104 shown in FIG. 1, through the one or more network interface(s) 1416. In this manner, the electronic system 1400 can be a part of a network of computers (such as a LAN, a wide area network ("WAN" or an Intranet, or a network of networks, such as the Internet. Any or all components of the electronic system 1400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read; written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM; FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device; while in other implementations; the tangible computer-readable storage medium can be indirectly coupled to a computing device, e.g., via one or more wired connections; one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects; modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    receiving plural terms corresponding to a map-based search query on a device;
    determining plural interpretations of the map-based search query, each interpretation based on a respective combination of tagging one or more of the plural terms as at least one of a first type, a second type or a third type, wherein a first interpretation of the plural interpretations comprises tagging a first of the plural terms as the first type and a second of the plural terms as the second type which differs from the first type;

for each interpretation of the plural interpretations,
determining a set of weight values for the interpretation, based on at least one of context data of the device or on a feature of the respective combination of tagging one of more of the plural terms, and
assigning a score for the interpretation based on the set of weight values for the interpretation; and providing at least one completion suggestion or search result based on the plural interpretations of the map-based search query, and on the assigned scores for the plural interpretations.

2. The method of claim 1, wherein determining the set of weight values is performed by a machine learning model, and wherein the plural interpretations comprise the first interpretation based on a tagging of the first of the plural terms as the first type and the second of the plural terms as the second type and a second interpretation based on a tagging of the first of the plural terms as the second type and the second of the plural terms as the third type.

3. The method of claim 1, wherein the context data of the device corresponds to at least one of a location of the device, a geographical region of a map being displayed on the device, or a preferred language for the device.

4. The method of claim 1, wherein the feature corresponds to at least one of a location of a candidate result corresponding to the interpretation, or a popularity of the candidate result.

5. The method of claim 1, wherein the first type is a concept corresponding to at least one of a brand name, a category, an attribute or a proximity, the second type is a point of interest, and the third type is a geographical entity.

6. The method of claim 5, wherein the feature corresponds to a tag collocation value, which corresponds to a frequency with which a first tag of the brand name, the category, the attribute, the proximity, the point of interest, or the geographical entity occurs with a second tag of one of the brand name, the category, the attribute, the proximity, the point of interest, or the geographical entity.

7. The method of claim 5, wherein the feature corresponds to an entity collocation value, which corresponds to a frequency with which a first of the plural terms tagged as one of the brand name, the category, the attribute, the proximity, the point of interest, or the geographical entity occurs in sequence with a second of the plural terms tagged as one of the brand name, the category, the attribute, the proximity, the point of interest, or the geographical entity.

8. The method of claim 5, wherein tagging one or more of the plural terms is based on a geographical knowledge graph which is generated from click log data.

9. The method of claim 8, wherein the geographical knowledge graph comprises at least one of:
a concept graph for identifying at least one of the brand name, the category, the attribute or the proximity,
a point of interest graph for identifying the point of interest, or
a geography graph for identifying the geographical entity.

10. The method of claim 9, wherein each of the point of interest graph, the concept graph, and the geography graph is implemented as a weighted finite state transducer which analyzes terms on a per-character basis.

11. The method of claim 5, wherein the point of interest is a predefined global point of interest for providing as the at least one completion suggestion or search result independent of device location.

12. A device, comprising:
at least one processor; and
a memory including instructions that, when executed by the at least one processor, cause the at least one processor to:
receive plural terms corresponding to a map-based search query;
determine plural interpretations of the map-based search query, each interpretation based on a respective combination of tagging one or more of the plural terms as at least one of a first type, a second type or a third type;
for each interpretation of the plural interpretations,
determine, by a machine learning model, a set of weight values for the interpretation, based on at least one of context data of the device or a feature of the respective combination of tagging one of more of the plural terms, and
assign a score for the interpretation based on the set of weight values for the interpretation; and
provide at least one completion suggestion or search result based on the plural interpretations of the map-based search query, and on the assigned scores for the plural interpretations.

13. The device of claim 12, wherein the context data of the device corresponds to at least one of a location of the device, a geographical region of a map being displayed on the device, or a preferred language for the device.

14. The device of claim 12, wherein the feature corresponds to at least one of a location of a candidate result corresponding to the interpretation, or a popularity of the candidate result.

15. The device of claim 12, wherein the first type is a concept corresponding to at least one of a brand name, a category, an attribute or a proximity, the second type is a point of interest, and the third type is a geographical entity.

16. The device of claim 15, wherein the feature corresponds to a tag collocation value, which corresponds to a frequency with which a first tag of the brand name, the category, the attribute, the proximity, the point of interest, or the geographical entity occurs with a second tag of one of the brand name, the category, the attribute, the proximity, the point of interest, or the geographical entity.

17. The device of claim 15, wherein the feature corresponds to an entity collocation value, which corresponds to a frequency with which a first of the plural terms tagged as one of the brand name, the category, the attribute, the proximity, the point of interest, or the geographical entity occurs in sequence with a second of the plural terms tagged as one of the brand name, the category, the attribute, the proximity, the point of interest, or the geographical entity.

18. The device of claim 15, wherein tagging one of more of the plural terms is based on a geographical knowledge graph which is generated from click log data.

19. The device of claim 18, wherein the geographical knowledge graph comprises at least one of:
a concept graph for identifying at least one of the brand name, the category, the attribute or the proximity,
a point of interest graph for identifying the point of interest, or
a geography graph for identifying the geographical entity.

20. A computer program product comprising code stored in a non-transitory computer-readable storage medium, the code comprising:
code to receive plural terms corresponding to a map-based search query on a device;

code to determine plural interpretations of the map-based search query, each interpretation based on a respective combination of tagging one or more of the plural terms as at least one of a first type, a second type or a third type, based on a geographical knowledge graph generated from click log data, code to, for each interpretation of the plural interpretations,
- determine a set of weight values for the interpretation, based on at least one of context data of the device or a feature of the respective combination of tagging one of more of the plural terms, and
- assign a score for the interpretation based on the set of weight values for the interpretation; and code to provide at least one completion suggestion or search result based on the plural interpretations of the map-based search query, and on the assigned scores for the plural interpretations.

* * * * *